United States Patent
Singh et al.

(10) Patent No.: US 12,190,563 B2
(45) Date of Patent: Jan. 7, 2025

(54) CONVOLUTIONAL MACHINE LEARNING MODELS USING MULTIPLE TILING MECHANISMS

(71) Applicant: Optum, Inc., Minnetonka, MN (US)

(72) Inventors: Rama Krishna Singh, Greater Noida (IN); Ravi Pande, Noida (IN); Priyank Jain, Noida (IN)

(73) Assignee: Optum, Inc., Minnetonka, MN (US)

( * ) Notice: Subject to any disclaimer, the term of this patent is extended or adjusted under 35 U.S.C. 154(b) by 247 days.

(21) Appl. No.: 17/812,308

(22) Filed: Jul. 13, 2022

(65) Prior Publication Data
US 2024/0020946 A1    Jan. 18, 2024

(51) Int. Cl.
*G06V 10/764* (2022.01)
*G06V 10/10* (2022.01)
(Continued)

(52) U.S. Cl.
CPC ............ *G06V 10/764* (2022.01); *G06V 10/16* (2022.01); *G06V 10/22* (2022.01); *G06V 10/56* (2022.01); *G06V 2201/03* (2022.01)

(58) Field of Classification Search
CPC ........ G06V 10/16; G06V 10/22; G06V 10/50; G06V 10/56; G06V 10/764; G06V 2201/03
See application file for complete search history.

(56) References Cited

U.S. PATENT DOCUMENTS

| | | | |
|---|---|---|---|
| 2005/0251740 A1* | 11/2005 | Shur | G06F 40/197 |
| | | | 715/251 |
| 2006/0081714 A1* | 4/2006 | King | G06V 10/12 |
| | | | 235/472.03 |

(Continued)

FOREIGN PATENT DOCUMENTS

WO     2016/057960 A1     4/2016

OTHER PUBLICATIONS

Hongming Xu et al.,"Automatic Classification of Prostate Cancer Gleason Scores from Digitized Whole Slide Tissue Biopsies," May 9, 2018,bioRxiv (2018): 315648,pp. 1-16.*

(Continued)

*Primary Examiner* — Omar S Ismail
(74) *Attorney, Agent, or Firm* — ALSTON & BIRD LLP

(57) ABSTRACT

As described herein, various embodiments of the present invention disclose techniques that improve efficiency of performing image-based machine learning operations on large images while limiting accuracy drawbacks of partial processing of those large images by using composite-tiled image embeddings for composite-tiled images generated by merging multiple tiled images that are generated using multiple tiling mechanisms. For example, in some embodiments, given an input image that comprises R image regions, each tiled image comprises N selected image regions of the R image regions that are selected in accordance with a tiling mechanism (where N<R). In this way, given T tiling mechansisms, T tiled images are generated, and the T tiled images are merged to generate a composite-tiled image. Accordingly, by using T tiling mechansisms, various embodiments enable reducing the size of feature data provided to an image processing machine learning model by selecting non-holistic subsets of an input image.

20 Claims, 9 Drawing Sheets

(51) Int. Cl.
*G06V 10/22* (2022.01)
*G06V 10/56* (2022.01)

(56) References Cited

U.S. PATENT DOCUMENTS

| | | | | |
|---|---|---|---|---|
| 2008/0014906 | A1* | 1/2008 | Tysowski | H04N 19/172 |
| | | | | 455/412.1 |
| 2010/0177950 | A1* | 7/2010 | Donovan | G16H 50/30 |
| | | | | 702/19 |
| 2010/0184093 | A1* | 7/2010 | Donovan | G16B 25/00 |
| | | | | 435/287.1 |
| 2012/0317470 | A1* | 12/2012 | Dejean | G06V 30/414 |
| | | | | 715/227 |
| 2013/0080134 | A1* | 3/2013 | Donovan | G16H 50/50 |
| | | | | 703/11 |
| 2014/0233826 | A1* | 8/2014 | Agaian | G06V 20/698 |
| | | | | 382/133 |
| 2017/0116679 | A1* | 4/2017 | Abraham | G06Q 40/10 |
| 2017/0193567 | A1* | 7/2017 | Xu | G06Q 30/0277 |
| 2020/0005901 | A1* | 1/2020 | Cohen | G06N 20/20 |
| 2020/0105413 | A1* | 4/2020 | Vladimirova | G16H 20/30 |
| 2020/0167914 | A1* | 5/2020 | Stamatoyannopoulos | |
| | | | | G16B 40/30 |
| 2020/0227168 | A1* | 7/2020 | Kimmerling | G06N 5/01 |
| 2022/0027652 | A1* | 1/2022 | Bhaskar | G06F 18/21 |
| 2022/0042109 | A1* | 2/2022 | Van Der Baan | G16B 25/10 |
| 2022/0366131 | A1* | 11/2022 | Ekron | G06F 16/951 |

OTHER PUBLICATIONS

Kaustav Bera et al., "Artificial intelligence in digital pathology—new tools for diagnosis and precision oncology,"Aug. 9, 2019, Clinical Oncology,Nov. 2019,vol. 16,pp. 703-711.*

Sayed Mohammad Ebrahim Sahraeian et al., "Deep convolutional neural networks for accurate somatic mutation detection," Mar. 4, 2019,Nature Communications,(2019) 10:1041,pp. 1-8.*

Yahui Jiang et al., "Emerging role of deep learning-based artificial intelligence in tumor pathology," Feb. 6, 2020, Cancer Communications, pp. 154-161.*

Shanshan He et al., "High-plex imaging of RNA and proteins at subcellular resolution in fixed tissue by spatial molecular imaging," Oct. 6, 2022,Nature Biotechnology,vol. 40,Dec. 2022, pp. 1794-1804.*

Yan Zhang, "Learning to Represent and Predict Sets with Deep Neural Networks,"Mar. 8, 2021, arXiv:2103.04957v1 [cs.LG], Dec. 2019, pp. 7-20,33-40,45-68.*

"Prostate Cancer," Medline Plus, National Institute of Health—National Library of Medicine, (9 pages), (article, online), [Retrieved from the Internet Aug. 22, 2022] <URL: https://medlineplus.gov/genetics/condition/prostate-cancer/#causes>.

Bera, Kaustav et al. "Artificial Intelligence In Digital Pathology—New Tools For Diagnosis and Precision Oncology," Nature Reviews Clinical Oncology, vol. 16, No. 11, Nov. 27, 2019, (ePub: Aug. 9, 2019), pp. 703-715, DOI: 10.1038/s41571-019-0252-y.

Jiang, Yahui et al. "Emerging Role of Deep Learning-Based Artificial Intelligence In Tumor Pathology," Cancer Communications, vol. 40, Feb. 6, 2020, pp. 154-166, DOI: 10.1002/cac2.12012.

Mahon, Suzanne. "Germline and Somatic Variants: What Is The Difference?," Jan. 14, 2020, (3 pages), ONS Oncology Nursing Foundation Voice, [Retrieved from the Internet Aug. 22, 2022] <URL: https://voice.ons.org/news-and-views/germline-and-somatic-variants-what-is-the-difference>.

Sahraeian, Sayed Mohammad Ebrahim et al. "Deep Convolutional Neural Networks For Accurate Somatic Mutation Detection," Nature Communications, vol. 10, Issue 1041, Mar. 4, 2019, pp. 1-10, DOI: 10.1038/s41467-019-09027.

Xu, Hongming et al. "Automatic Classification of Prostate Cancer Gleason Scores from Digitized Whole Slide Tissue Biopsies," bioRxiv preprint 315648, May 9, 2018, pp. 1-17 pages, DOI: 10.1101/315648.

* cited by examiner

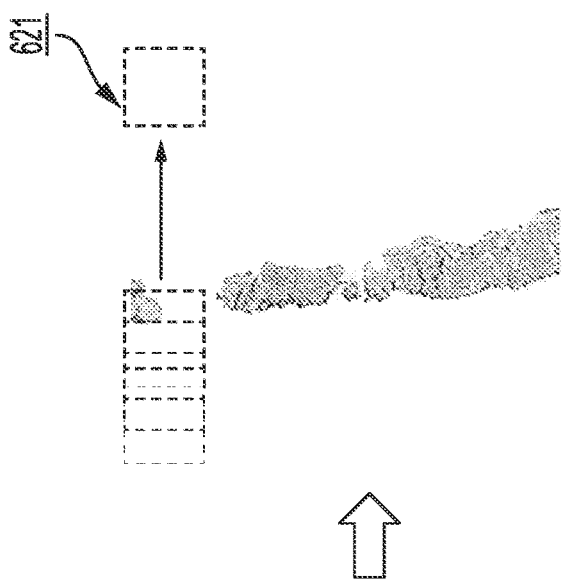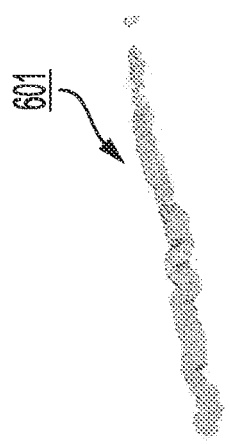
FIG. 6

CONVOLUTIONAL MACHINE LEARNING MODELS USING MULTIPLE TILING MECHANISMS

BACKGROUND

Various embodiments of the present invention address technical challenges related to performing predictive data analysis operations and address the efficiency and reliability shortcomings of various existing predictive data analysis solutions, in accordance with at least some of the techniques described herein.

BRIEF SUMMARY

Various embodiments of the present invention disclose techniques that improve efficiency of performing image-based machine learning operations on large input images while limiting accuracy drawbacks of partial processing of those large input images by using composite-tiled image embeddings for composite-tiled images generated by merging multiple tiled images generated using multiple tiling mechansisms. For example, in some embodiments, given an input image that comprises R image regions, each tiled image comprises N selected image regions of the R image regions that are selected in accordance with a tiling mechanism (where N<R). In this way, given T tiling mechansisms, T tiled images are generated, and then the T tiled images are merged to generate a composite-tiled image. The composite-tiled image is then used to generate a composite-tiled image embedding that is used to generate a predictive output. In this way, by using T tiling mechansisms, various embodiments of the present invention enable reducing the size of input feature data provided to an image processing machine learning model by selecting non-holistic subsets of the image regions of an input image, while reducing accuracy drawbacks of this partial (i.e., non-holistic) processing of the input image by using multiple tiled images and multiple distinct tiling mechanisms. Reducing the size of input feature data provided to an image processing machine learning model in turn reduces the number of input processing operations that need to be performed by the noted image processing machine learning model, thus increasing computational efficiency of the image processing machine learning model. These techniques are specially useful for reducing computational efficiency of image processing machine learning models that are configured to process data associated with large images, such as large biopsy images. In this way, by using composite-tiled image embeddings for composite-tiled images generated by merging multiple tiled images generated using multiple tiling mechansisms, various embodiments of the present invention improve efficiency of performing image-based machine learning operations on large input images while limiting accuracy drawbacks of partial processing of those large input images. In some embodiments, generating the predictive output comprises: generating, using a somatic mutation detection machine learning model, and based at least in part on an input genomic sequence for the prediction input data object, a genomic embedding for the input genomic sequence, wherein: (i) the genomic embedding is generated by a sub-ultimate layer of the somatic mutation detection machine learning model, and (ii) an ultimate layer of the somatic mutation detection machine learning model is configured to generate a somatic mutation prediction for a given input genomic sequence based at least in part on the genomic embedding for the given input genomic sequence as generated by the sub-ultimate layer; generating, based at least in part on the genomic embedding and a composite-tiled image embedding, a hybrid square matrix for the prediction input data object; and generating, using a hybrid input prediction machine learning model, and based at least in part on the hybrid square matrix, the predictive output.

In accordance with one aspect, a method is provided. In one embodiment, the method comprises: for each image region, generating a color distribution ratio set that comprises: (i) a whitespace presence ratio for the image region, and (ii) one or more non-whitespace color range presence ratios for the image region with respect to one or more non-whitespace color ranges; generating a plurality of tiled image for the input image, wherein: (i) each tiled image is associated with a respective tiling mechanism of a plurality of tiling mechanisms, (ii) each tiled image is generated by selecting a respective N-sized tiled region subset of the plurality of image regions in accordance with the respective tiling mechanism for the tiled image, (iii) N is a region selection count hyper-parameter that is shared across the plurality of tiling mechanisms, and (iv) the plurality of image tiling mechanisms comprise a greedy thresholding tiling mechanism that is configured to generate the respective N-sized tiled region subset by selecting, from an occurrence-based region sequence of the plurality of image regions that is ordered in accordance with each region position indicator for the plurality of image regions, first-occurring N image regions whose color distribution ratio sets satisfy one or more color distribution ratio thresholds; generating a composite-tiled image for the input image that comprises the plurality of tiled image; generating, using a composite-tiled image prediction machine learning model, and based at least in part on the composite-tiled image, a composite-tiled image embedding for the input image; generating a predictive output based at least in part on the composite-tiled image embedding; and performing one or more prediction-based actions based at least in part on the predictive output.

In accordance with another aspect, a computer program product is provided. The computer program product may comprise at least one computer-readable storage medium having computer-readable program code portions stored therein, the computer-readable program code portions comprising executable portions configured to: for each image region, generate a color distribution ratio set that comprises: (i) a whitespace presence ratio for the image region, and (ii) one or more non-whitespace color range presence ratios for the image region with respect to one or more non-whitespace color ranges; generate a plurality of tiled image for the input image, wherein: (i) each tiled image is associated with a respective tiling mechanism of a plurality of tiling mechanisms, (ii) each tiled image is generated by selecting a respective N-sized tiled region subset of the plurality of image regions in accordance with the respective tiling mechanism for the tiled image, (iii) N is a region selection count hyper-parameter that is shared across the plurality of tiling mechanisms, and (iv) the plurality of image tiling mechanisms comprise a greedy thresholding tiling mechanism that is configured to generate the respective N-sized tiled region subset by selecting, from an occurrence-based region sequence of the plurality of image regions that is ordered in accordance with each region position indicator for the plurality of image regions, first-occurring N image regions whose color distribution ratio sets satisfy one or more color distribution ratio thresholds; generate a composite-tiled image for the input image that comprises the plurality of tiled image; generate, using a composite-tiled image prediction machine learning model, and based at least in part on the composite-tiled image, a composite-tiled image embedding for the input image; generate a predictive output based at least in part on the composite-tiled image embedding; and perform one or more prediction-based actions based at least in part on the predictive output.

In accordance with yet another aspect, an apparatus comprising at least one processor and at least one memory including computer program code is provided. In one embodiment, the at least one memory and the computer program code may be configured to, with the processor, cause the apparatus to: for each image region, generate a color distribution ratio set that comprises: (i) a whitespace presence ratio for the image region, and (ii) one or more non-whitespace color range presence ratios for the image region with respect to one or more non-whitespace color ranges; generate a plurality of tiled image for the input image, wherein: (i) each tiled image is associated with a respective tiling mechanism of a plurality of tiling mechanisms, (ii) each tiled image is generated by selecting a respective N-sized tiled region subset of the plurality of image regions in accordance with the respective tiling mechanism for the tiled image, (iii) N is a region selection count hyper-parameter that is shared across the plurality of tiling mechanisms, and (iv) the plurality of image tiling mechanisms comprise a greedy thresholding tiling mechanism that is configured to generate the respective N-sized tiled region subset by selecting, from an occurrence-based region sequence of the plurality of image regions that is ordered in accordance with each region position indicator for the plurality of image regions, first-occurring N image regions whose color distribution ratio sets satisfy one or more color distribution ratio thresholds; generate a composite-tiled image for the input image that comprises the plurality of tiled image; generate, using a composite-tiled image prediction machine learning model, and based at least in part on the composite-tiled image, a composite-tiled image embedding for the input image; generate a predictive output based at least in part on the composite-tiled image embedding; and perform one or more prediction-based actions based at least in part on the predictive output.

BRIEF DESCRIPTION OF THE DRAWINGS

Figure 1:
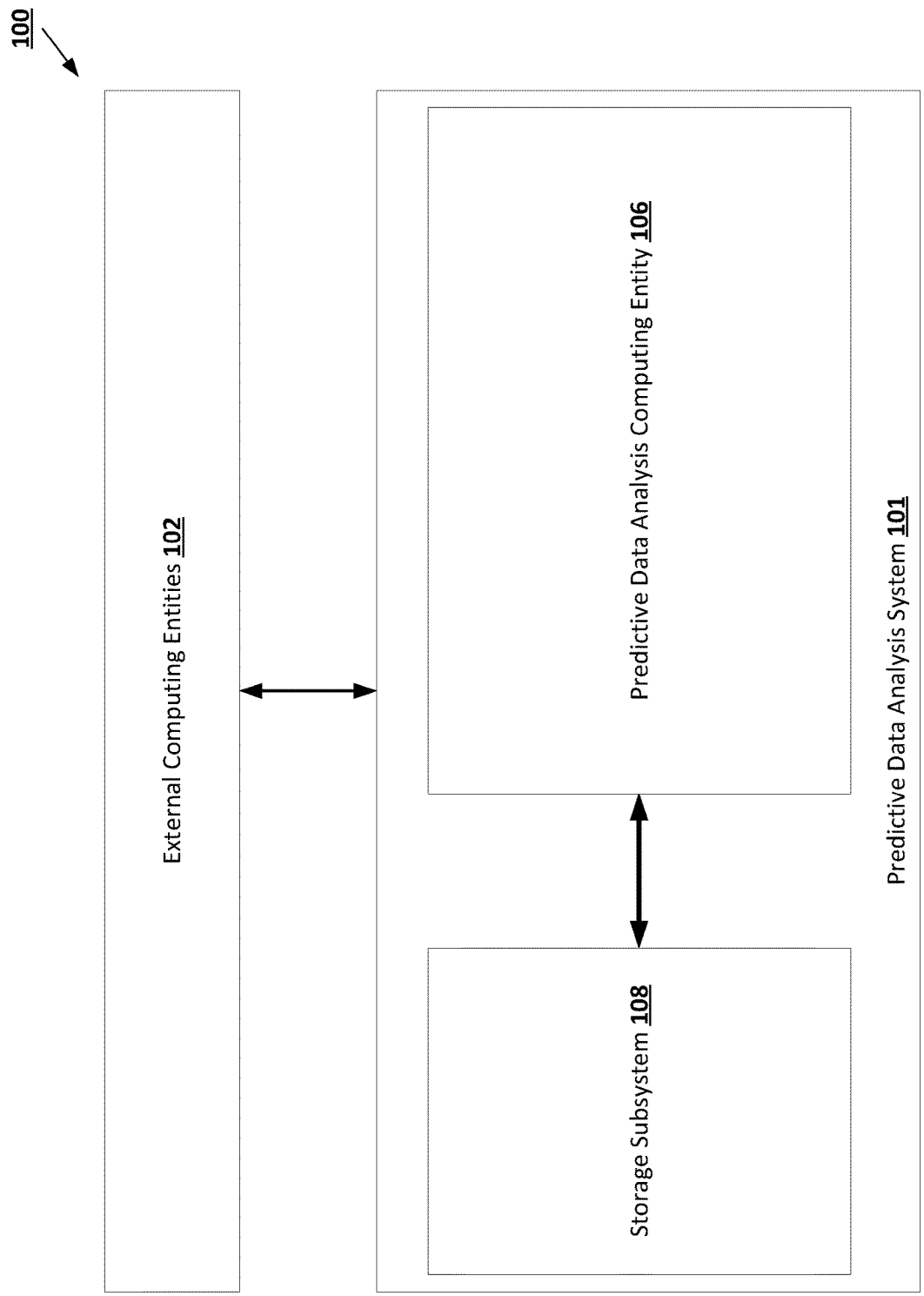

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
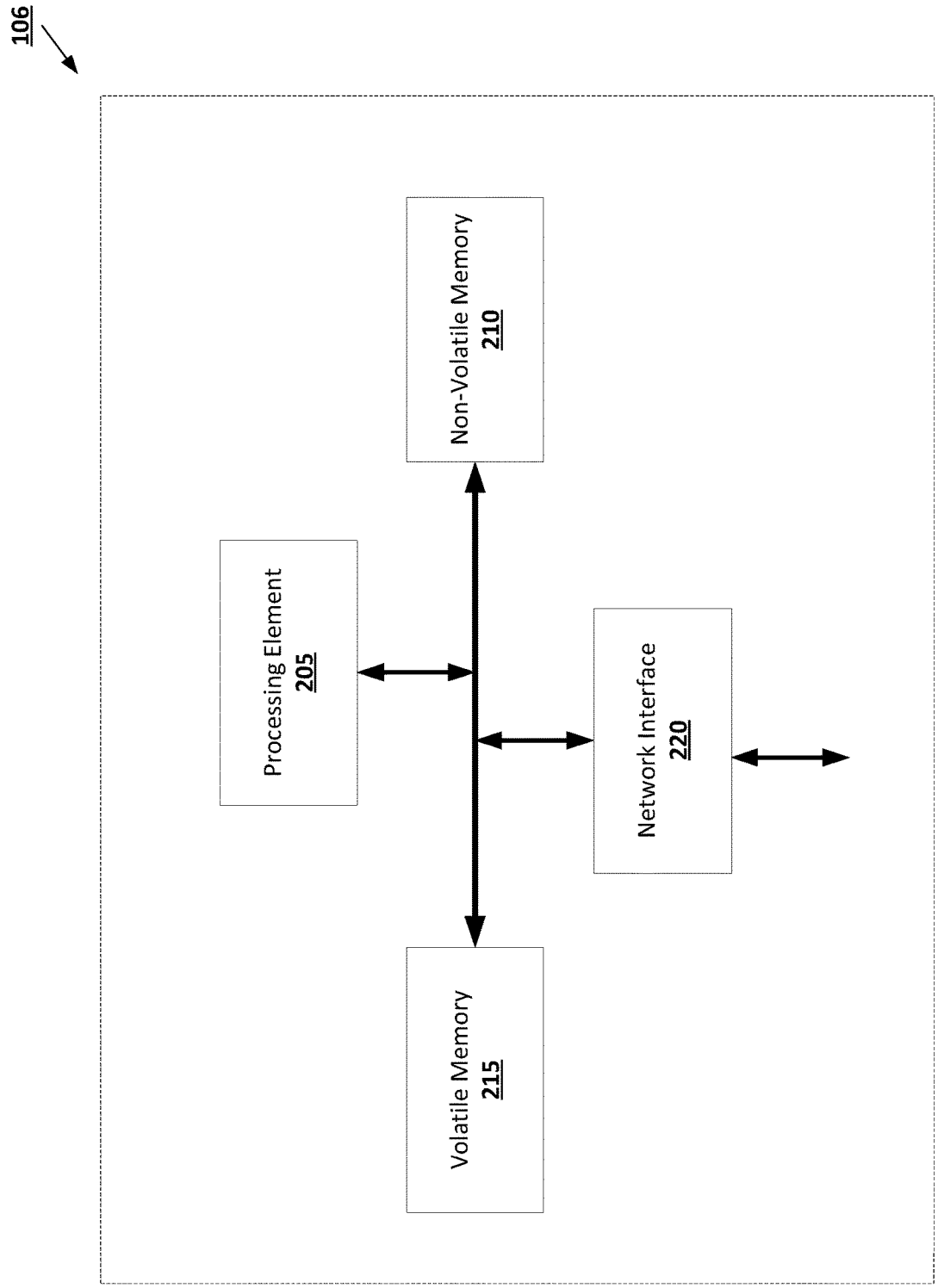

FIG. 2 provides an example predictive data analysis computing entity in accordance with some embodiments discussed herein.

Figure 3:
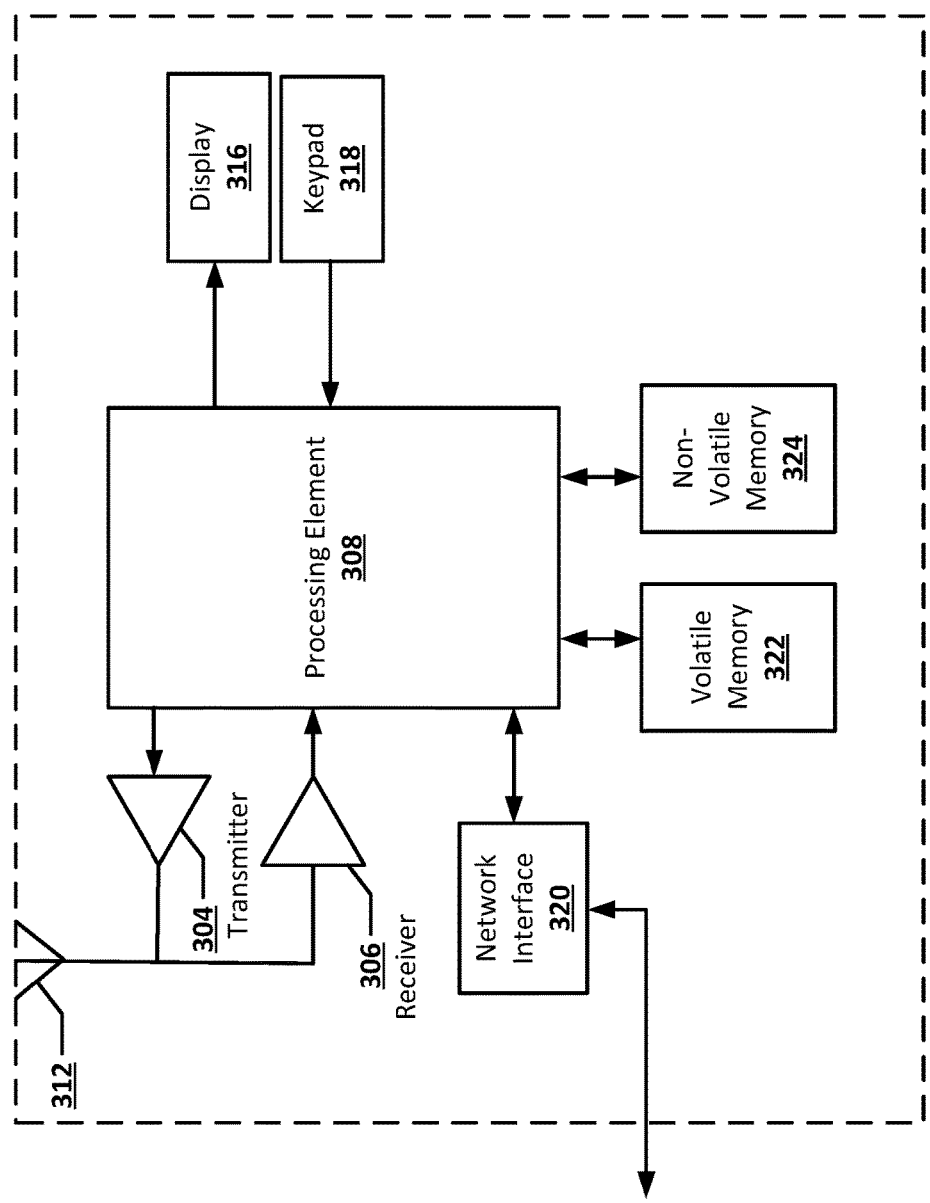

FIG. 3 provides an example client computing entity in accordance with some embodiments discussed herein.

Figure 4:
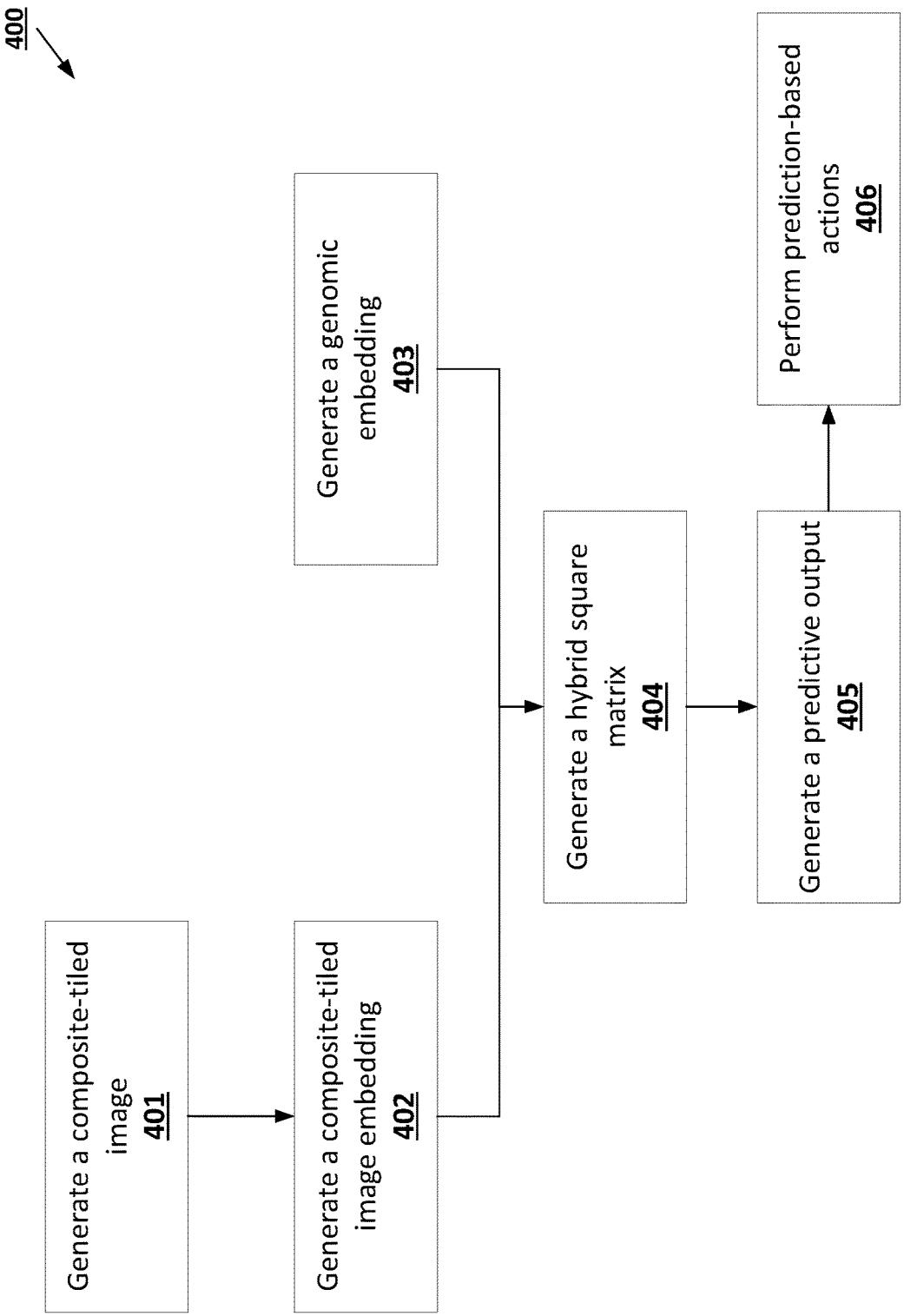

FIG. 4 is a flowchart diagram of an example process for generating a predictive output for a prediction input data object in accordance with some embodiments discussed herein.

Figure 5:
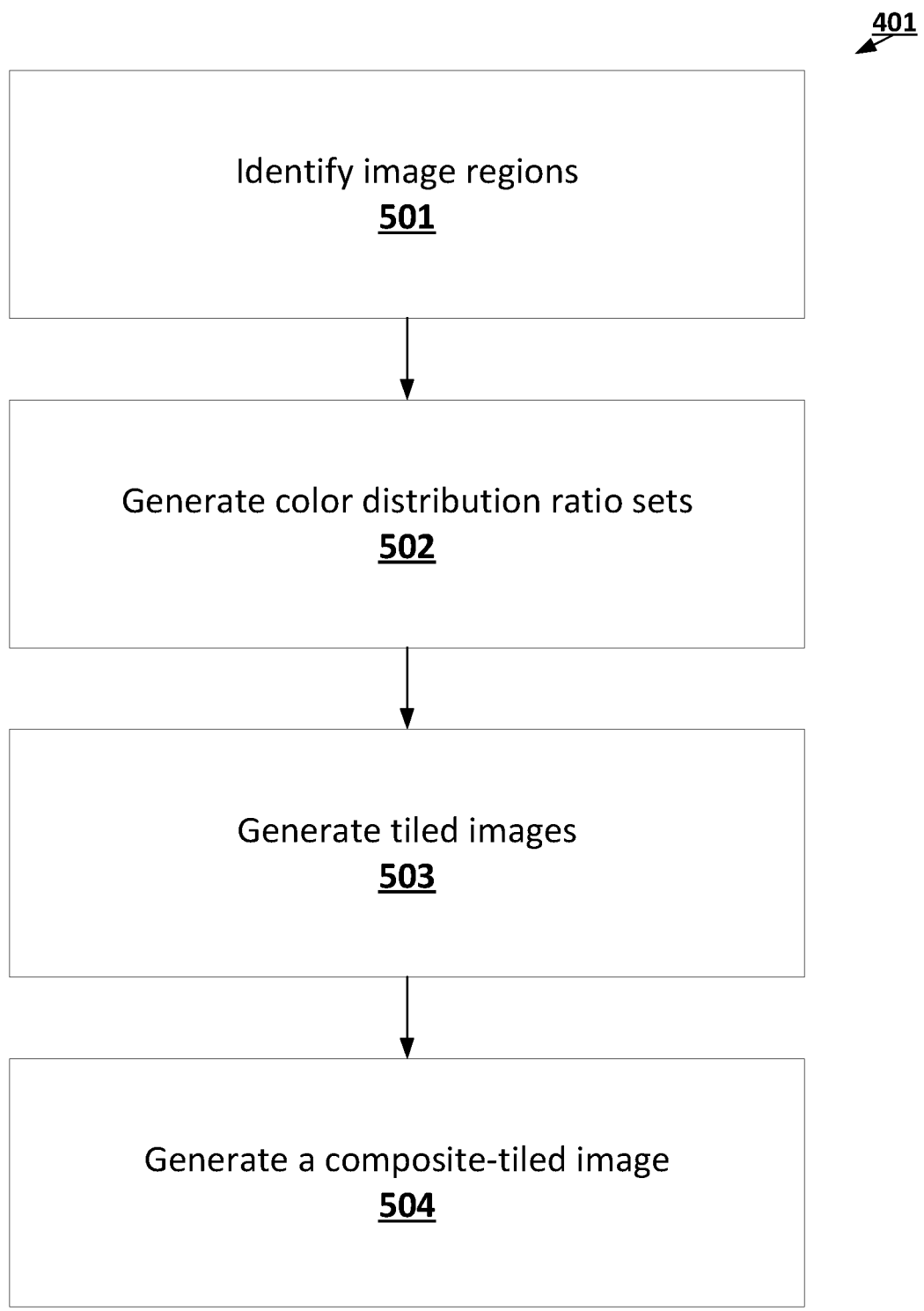

FIG. 5 is a flowchart diagram of an example process for generating a composite-tiled image for an input image in accordance with some embodiments discussed herein.

FIG. 6 provides an operational example of generating an image segment in accordance with some embodiments discussed herein.

Figure 7:
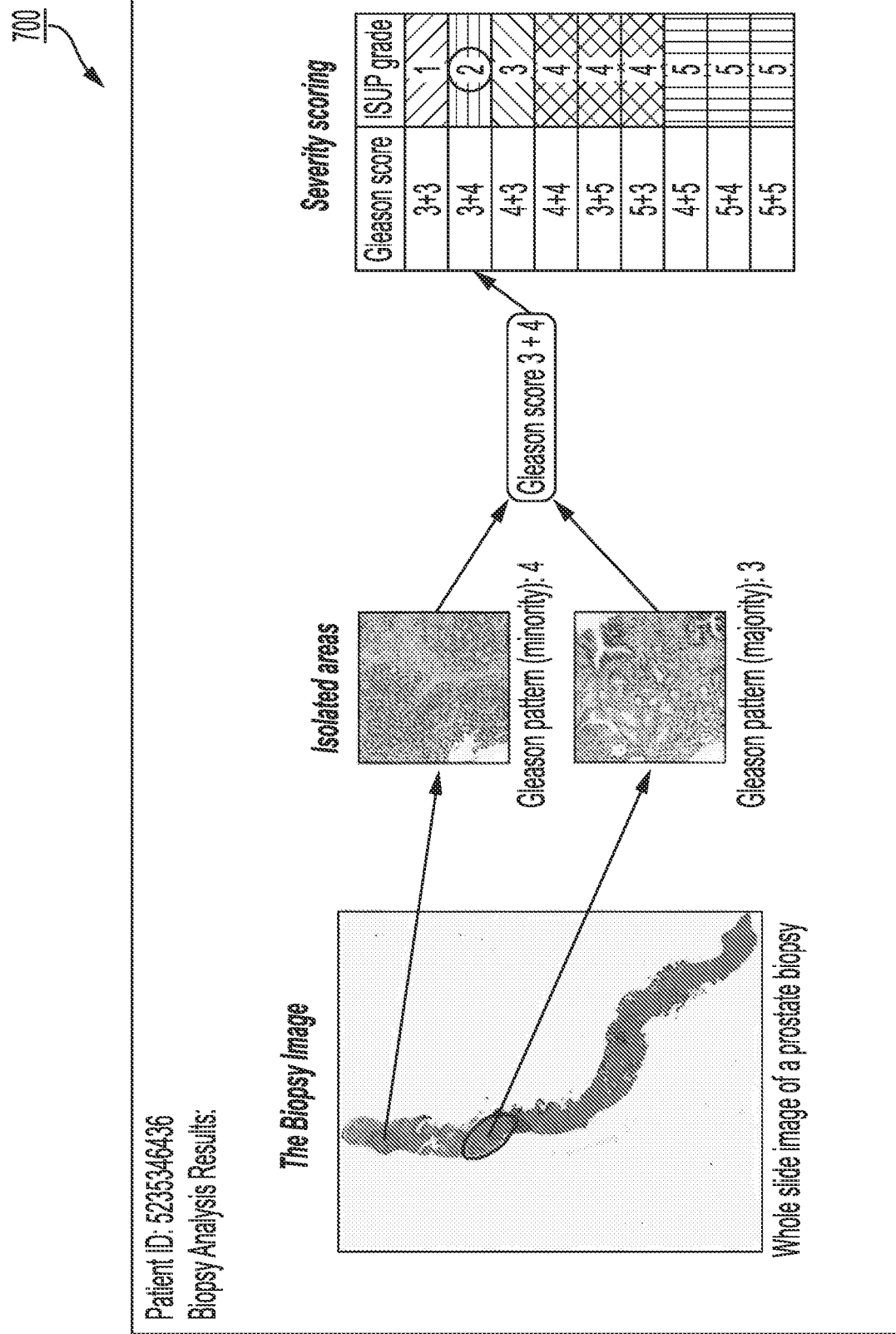

FIG. 7 provides an operational example of a prediction output user interface in accordance with some embodiments discussed herein.

Figure 8:
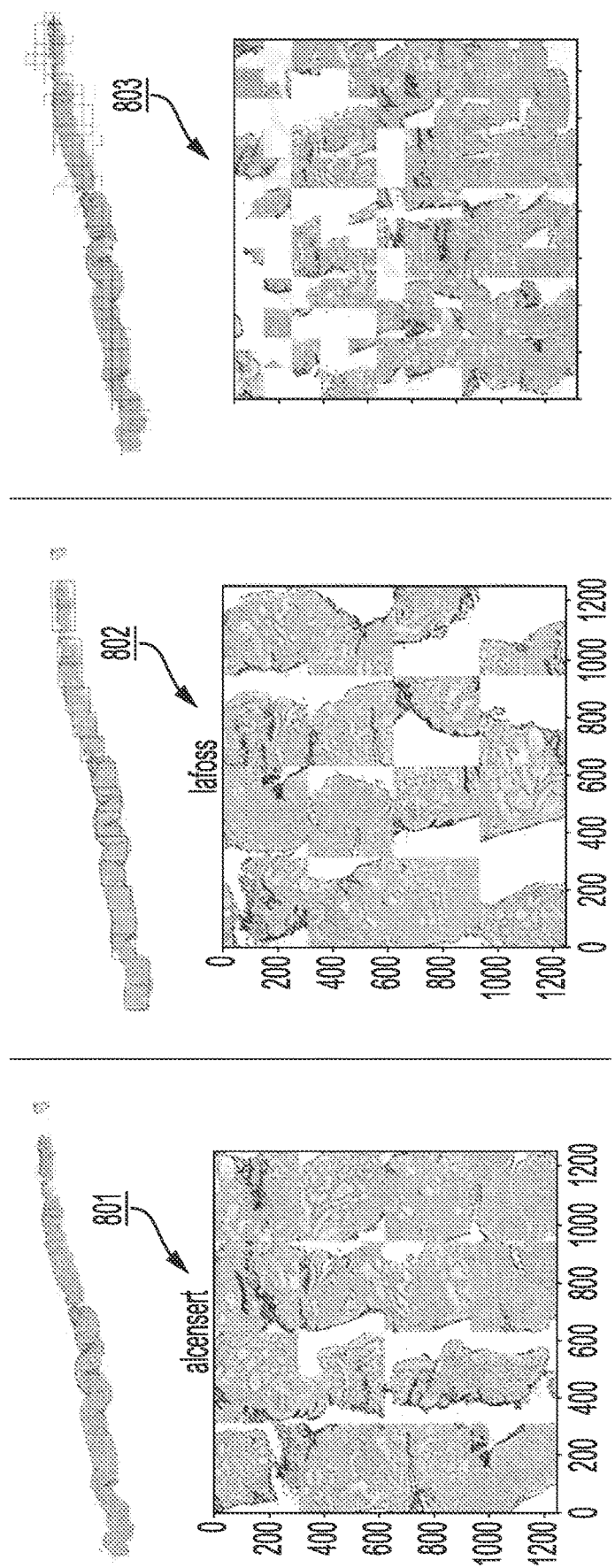

FIG. 8 provides an operational example of three tiled images generated using three tiling mechanisms in accordance with some embodiments discussed herein.

Figure 9:
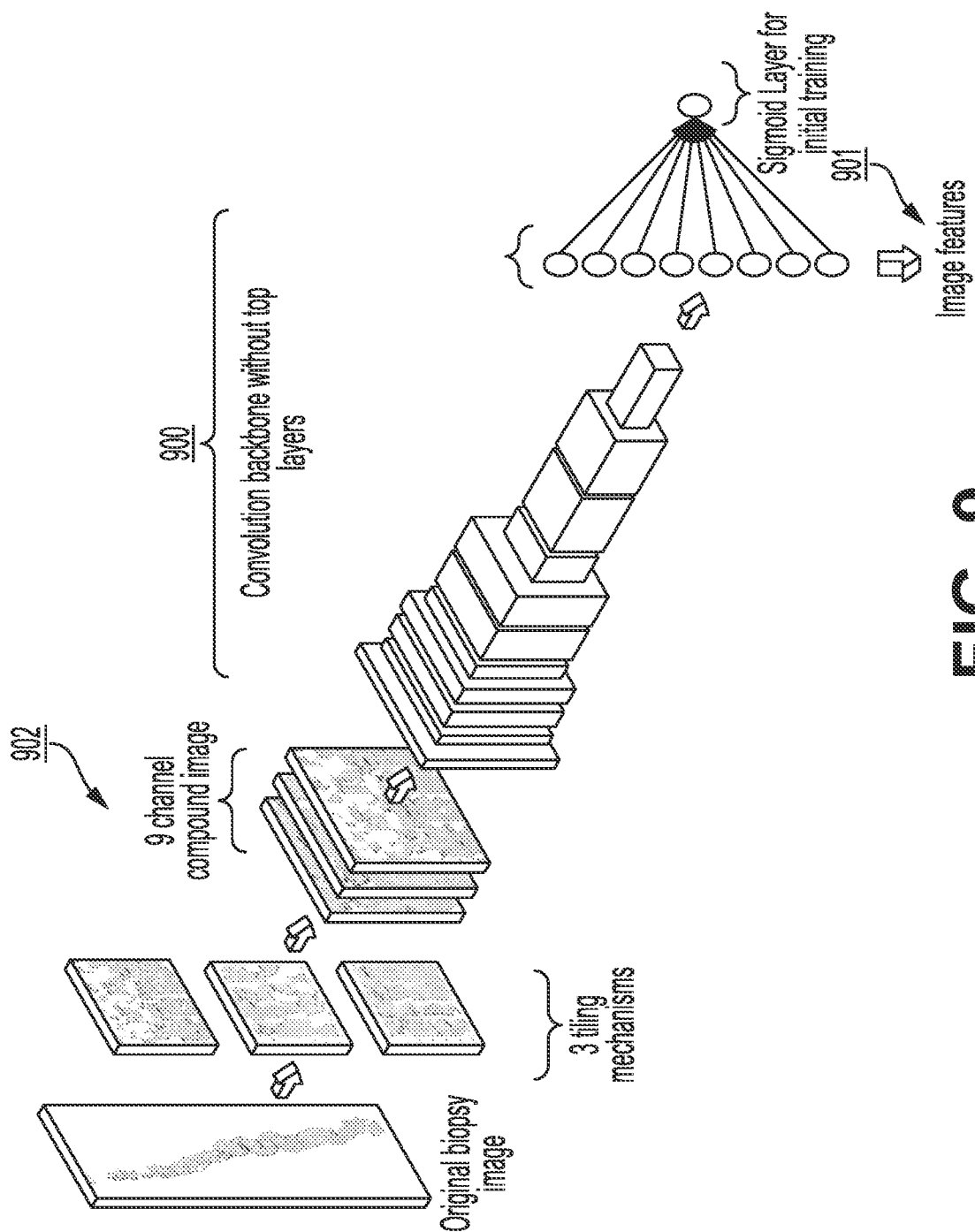

FIG. 9 provides an operational example of generating a composite-tiled image embedding for a composite-tiled image in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis tasks.

I. Overview and Exemplary Technical Improvements

Various embodiments of the present invention disclose techniques that improve efficiency of performing image-based machine learning operations on large input images while limiting accuracy drawbacks of partial processing of those large input images by using composite-tiled image embeddings for composite-tiled images generated by merging multiple tiled images generated using multiple tiling mechansisms. For example, in some embodiments, given an input image that comprises R image regions, each tiled image comprises N selected image regions of the R image regions that are selected in accordance with a tiling mechanism (where N<R). In this way, given T tiling mechansisms, T tiled images are generated, and then the T tiled images are merged to generate a composite-tiled image. The composite-tiled image is then used to generate a composite-tiled image embedding that is used to generate a predictive output. In this way, by using T tiling mechanisms, various embodiments of the present invention enable reducing the size of input feature data provided to an image processing machine learning model by selecting non-holistic subsets of the image regions of an input image, while reducing accuracy drawbacks of this partial (i.e., non-holistic) processing of the input image by using multiple tiled images and multiple distinct tiling mechanisms. Reducing the size of input feature data provided to an image processing machine learning model in turn reduces the number of input processing operations that need to be performed by the noted image processing machine learning model, thus increasing computational efficiency of the image processing machine learning model. These techniques are specially useful for reducing computational efficiency of image processing machine learning models that are configured to process data associated with large images, such as large biopsy images. In this way, by using composite-tiled image embeddings for composite-tiled images generated by merging multiple tiled images generated using multiple tiling mechansisms, various embodiments of the present invention improve efficiency of performing image-based machine learning operations on large input images while limiting accuracy drawbacks of partial processing of those large input images.

For example, in some embodiments, composite-tiled images may be generated using at least one of the following three tiling mechanisms: a greedy thresholding tiling mechanism, a sorted selection tiling mechanism, and a sorted row-wise selection tiling mechanism. In some embodiments, a greedy thresholding tiling mechanism is configured to select N image regions of an input image by selecting first-occurring N image regions whose color distribution ratio sets satisfy one or more color distribution ratio thresholds from an occurrence-based region sequence associated with the R image regions of the input image. In some embodiments, the greedy thresholding tiling mechanism: (i) identifies an occurrence-based region sequence associated with the R image regions of the input image, and (ii) starting from the first image region in the occurrence-based region sequence, selects those image regions that confirm to an ideal image region profile as defined by the one or more color distribution ratio thresholds until N image regions are selected. For example, consider an input image that comprises R=6 image regions: R1, R2, R3, R4, R5, and R6. If the occurrence-based region sequence six image regions is defined by the sequence {R1→R2→R3→R4→R5→R6}, and if N=4, and if R1, R2, R3, R5, and R6 conform to an ideal image region profile while R4 does not confirm to the ideal image region profile, then applying the greedy thresholding tiling mechanism to the noted input image may include the following operations: (i) determining that R1 conforms to the ideal image region profile and thus selecting R1 (which increase n to one, with n being an index variable that describes the size of the already-selected image regions), (ii) determining that R2 conforms to the ideal image region profile and thus selecting R2 (which increase n to two), (iii) determining that R3 conforms to the ideal image region profile and thus selecting R3 (which increase n to three), (iv) determining that R4 fails to conform to the ideal image region profile and thus discarding R4 (which leaves n unchanged), (v) determining that R5 conforms to the ideal image region profile and thus selecting R5 (which increase n to four), and (vi) terminating the process as n now has reached the value of N=4.

In some embodiments, a sorted selection tiling mechanism is configured to select N image regions of an input image by selecting first-ranked/top-ranked N image regions from a distribution-based region ranking of R image regions of the input region. In some embodiments, the sorted selection tiling mechanism: (i) identifies a distribution-based region ranking of R image regions of an input image, and (ii) selects the first N image regions from the distribution-based region ranking. For example, consider an input image that comprises R=6 image regions: R1, R2, R3, R4, R5, and R6. If the distribution-based region ranking for the six image regions is defined by the ranking {R3→R1→R4→R5→R6→R2}, and if N=4, then the sorted selection tiling mechanism may select R3, R1, R4, and R5 and may discard R6 and R2.

In some embodiments, a sorted row-wise selection tiling mechanism is configured to select, from the $R/\sqrt{N}$ image regions that are in a horizontal row of $\sqrt{N}$ horizontal rows of an input image, first-ranked/top-ranked VW image regions of the $R/\sqrt{N}$ image regions of a row-wise distribution-based region ranking of image regions in the horizontal row that is generated based at least in part on each color distribution ratio set for the image regions. In some embodiments, to select N image regions of an input image that has R image regions, the sorted row-wise selection tiling mechanism: (i) identifies/generates $\sqrt{N}$ horizontal rows of the input image, where each horizontal row is a segment of the input image that spans across the entire horizontal dimension of the input image and comprises all of the $R/\sqrt{N}$ image regions of the input image that fall within the noted segment, (ii) for each horizontal row, (a) generates a ranking of the $R/\sqrt{N}$ image regions in the horizontal row that is referred to herein as the row-wise distribution-based region ranking for the horizontal row, and (b) selects the first-ranked/top-ranked VW image regions of the $R/\sqrt{N}$ image regions of the horizontal row according to the row-wise distribution-based region ranking for the horizontal row, and (iii) aggregates all selected $\sqrt{N}$-sized image region sets for the $\sqrt{N}$ horizontal rows to generate $\sqrt{N} * \sqrt{N} = N$ selected image regions. For example, consider an input image that comprises R=6 image regions: R1, R2, R3, R4, R5, and R6, where R1, R2, and R3 belong to a first horizontal row and R4, R5, and R6 belong to a second horizontal row. If the row-wise distribution-based region ranking for the first row is characterized by the ranking {R2→R3→R1} and the row-wise distribution-based region ranking for the first row is characterized by the ranking {R4→R6→R5}, and given N=4 (which means there are $\sqrt{4}=2$ rows each having $6/\sqrt{4}=6/2=3$ image regions), then the sorted row-wise selection tiling mechanism selects the four image regions by selecting $\sqrt{4}=2$ first-ranked/top-ranked image regions from {R2→R3→R1} and selecting $\sqrt{4}=2$ first-ranked/top-ranked image regions {R4→R6→R5}, thus selecting the four image regions R2, R3, R4, and R6. In some embodiments, the number of image rows depends on the size of the sliding window and the size of the image. For example, if the sliding window is 100 pixels in height and the image is 1000 pixels in height, then there will be 10 rows. Accordingly, since most biopsy images are not squares, the number of rows will not always be $\sqrt{N}$.

An operational example of various embodiments of the present invention relates to generating a Gleason score for an individual based at least in part on processing genomic feature data and image-based feature data for the individual using a convolutional neural network, where the image-based feature data is determined by compounding two or more tiled images of a biopsy image of the individual that is prepared using two or more distinct tiling mechanisms. In some embodiments, image data is processed using the following operations: receiving a biopsy image associated with the individual; generating three tiled images based at least in part on the biopsy image, where: (i) each tiled image is a three-channeled image with an R (red) channel, a G (green) channel, and a B (blue) channel, and (ii) each tiled image is generated by tiling non-white portions of the biopsy image using a separate tiling mechanism; compounding the three tiled images to generate a composite-tiled image, where the composite-tiled image has a total of 9 channels: three R channels, three G channels, and three B channels; and generating feature data based at least in part on the composite-tiled image. In addition to the image data, feature data extracted from the deoxyribonucleic acid (DNA) sequencing of the biopsy of the individual is also used as inputs to a Gleason score determination machine learning model. In some embodiments, the image-based feature data is used to generate a dual-component Gleason score for the individual, while the genomic data is used to distinguish the dual-component Gleason score from other edge-case dual-component Gleason scores. For example, if an inference based at least in part on the image data shows that the individual is suffering from a Gleason score of 3+4, then this Gleason score may be distinguished from the more lethal Gleason score of 4+3 based at least in part on presence or absence of genomic indicators such as BRCA1, BRCA2, CHEK2, ATM, PALB2, RAD51D, and HOXB13. In some embodiments, the genomic feature data and the image feature data are combined using a convolutional neural network to generate the final Gleason score.

As described above, in some embodiments, the tiled images may be generated based at least in part on three distinct tiling mechanisms. A first tiling mechanism may involve: rotating the biopsy image into the portrait mode, moving a box frame over the biopsy with small overlaps, capturing the area within the box, and testing the area for presence of white region, tissue, or nuclei, and capturing tiles that are either white or with nuclei coverage. A second tiling mechanism may involve: rotating the biopsy image into the portrait mode, moving a box frame over the biopsy with small overlaps, capturing the area within the box, and testing the area for presence of white region, tissue, or nuclei, recording each tile with either a white area of with nuclei coverage in an array, sorting the array, and capturing the top 64 tiles in the array. A third tiling mechanism may involve: rotating the biopsy image into the portrait mode, moving a box frame over the biopsy with small overlaps, capturing the area within the box, and testing the area for presence of white region, tissue, or nuclei, storing values for all boxed tiles in a row based at least in part on a horizontal movement of the tile window, and selecting the most suitable tiles based at least in part on the noted stored values.

Moreover, various embodiments of the present invention enable technologically advantageous techniques for performing operational load balancing for the post-prediction systems that perform post-prediction operations (e.g., automated specialist appointment scheduling operations) based at least in part on predictive outputs. For example, in some embodiments, a predictive data analysis computing entity determines D classifications for D prediction input data objects based at least in part on the D predictive outputs for the for D prediction input data objects. Then, the count of D prediction input data objects that are associated with an affirmative classification, along with a resource utilization ratio for each prediction input data objects, can be used to predict a predicted number of computing entities needed to perform post-prediction processing operations with respect to the D prediction input data objects. For example, in some embodiments, the number of computing entities needed to perform post-prediction processing operations (e.g., automated specialist scheduling operations) with respect to D prediction input data objects can be determined based at least in part on the output of the equation: $R=\text{ceil}(\Sigma_k^{k=K} ur_k)$, where R is the predicted number of computing entities needed to perform post-prediction processing operations with respect to the D prediction input data objects, ceil(·) is a ceiling function that returns the closest integer that is greater than or equal to the value provided as the input parameter of the ceiling function, k is an index variable that iterates over K prediction input data objects among the D prediction input data objects that are associated with affirmative classifications, and $ur_k$ is the estimated resource utilization ratio for a kth prediction input data object that may be determined based at least in part on a patient history complexity of a patient associated with the prediction input data object. In some embodiments, once R is generated, a predictive data analysis computing entity can use R to perform operational load balancing for a server system that is configured to perform post-prediction processing operations with respect to D prediction input data objects. This may be done by allocating computing entities to the post-prediction processing operations if the number of currently-allocated computing entities is below R, and deallocating currently-allocated computing entities if the number of currently-allocated computing entities is above R.

II. Definitions of Certain Terms

The term "prediction input data object" may refer to a data entity that describes input data associated with a predictive entity with respect to which one or more predictive data analysis operations are performed to generate a predictive output. For example, in some embodiments, the prediction input data object comprise at least one of an input biopsy image for a particular individual and an input genomic sequence for a particular individual, where at least one of the input biopsy image and the input genomic sequence is used to generate a predictive output for the particular individual, such as a predictive output that describes a cancer type and/or a cancer strain for the particular individual (e.g., a predictive output that describes whether a prostate cancer Gleason Score for the particular individual, a predictive output that describes whether a prostate cancer Gleason Score for the particular individual is a 3+4 Gleason score or a 4+3 Gleason score, and/or the like).

The term "composite-tiled image" may refer to a data entity that describes a merger of T tiled images associated with an input image. In some embodiments, to generate a composite-tiled image for an input image, T tiled images are generated based at least in part on the input image. Each tiled image may be an image that comprises N image regions of a corresponding input image, where the N image regions that are in a tiled image (also referred to herein as the "N-sized tiled region subset" for the tiled image) are selected from the image regions of the corresponding image in accordance with a respective tiling mechanism that is associated with the tiled image. In some embodiments, given an input image that comprises R image regions (e.g., R image pixels, R fixed-size box regions of the input image, R fixed-size box regions of the input image that are generated via moving a fixed-size box frame across and along the input image in a continuous manner, and/or the like), to generate a particular tiled image for the input image, N of the R image regions are selected in accordance with a particular tiling mechanism that is associated with the particular tiled image, and then the N selected image regions are included in the particular tiled image (e.g., a $\sqrt{N}*\sqrt{N}$ tiled image), where N<R. In some of the noted embodiments, given T tiled images that are generated based at least in part on TN-sized tiled region subset of the R image regions and in accordance with T tiling mechanisms, the T tiled images are merged into a composite-tiled image, such as a composite-tiled image that comprises T*D image channels, where T is the number of tiled images (and hence the number of applied tiling mechanisms), while D is the number of color model dimensions of a shared color model of the T tiled images. For example, if the T tiled images comprise three tiled images each associated with a Red-Green-Blue (RGB) color model, given T=3 and D=3 (e.g., with the three color model dimensions being the red dimension, the green dimension, and the blue dimension), then the composite-tiled image may be an image with 3*3=9 image channels.

The term "color distribution ratio" may refer to data entity that describes a ratio of the area covered by a corresponding image region that is occupied by a particular color range that is associated with the color distribution ratio. An example of a color distribution ratio may be a whitespace presence ratio that describes a ratio of the area covered by a corresponding image region that is occupied by whitespace content (i.e., by content having a white color), a non-whitespace color range presence ratio that describes a ratio of the area covered by a corresponding image that is occupied by a non-whitespace color region, and/or the like. For example, in some embodiments, the color distribution ratios for a particular image region include: (i) a whitespace presence ratio that describes a ratio of the area covered by the particular image region that is occupied by whitespace content, (ii) a light non-whitespace presence ratio that describes a ratio of the area covered by the particular image region that is covered by a color range that describes a set of lighter non-whitespace covers, and (iii) a dark non-whitespace presence ratio that describes a ratio of the area covered by the particular image region that is covered by a color range that describes a set of darker non-whitespace covers. As another example, in some embodiments, given an input biopsy image, the color distribution ratios for a particular image region of the input biopsy image include: (i) a whitespace presence ratio that describes a ratio of the area covered by the particular image region that is occupied by whitespace content, (ii) a tissue presence ratio that describes a ratio of the area covered by the particular image region that is covered by a color range that corresponds to tissue depictions, and (iii) a nuclei tissue presence ratio that describes a ratio of the area covered by the particular image region that is covered by a color range that corresponds to nuclei depictions. In some embodiments, the color distribution ratio set for an image region comprises: (i) a whitespace presence ratio for the image region, and (ii) one or more non-whitespace color range presence ratios for the image region with respect to one or more non-whitespace color ranges. In some embodiments (e.g., given a biopsy image), the one or more non-whitespace color ranges comprise a first non-whitespace color range that is associated with nuclei depiction within the biopsy image and a second non-whitespace color range that is associated with tissue depiction within the biopsy image.

The term "tiling mechanism" may refer to a data entity that describes a set of rules for selecting N image regions from R image regions of an input image, where N<R. In some embodiments, applying a tiling mechanism to an input image causes generating a respective N-sized tiled region subset of the R image regions of the input image, where the image regions in the respective N-sized tiled region subset may be used to generate a tiled image (e.g., a $\sqrt{N}*\sqrt{N}$ tiled image). Importantly, in some embodiments, given T tiling mechanisms, all of the T tiling mechanisms select N image regions for inclusion in a resulting tiled image, where N may be defined by region selection count hyper-parameter that is shared across the T tiling mechanisms. Examples of tiling mechanisms include a greedy thresholding tiling mechanism, a sorted selection tiling mechanism, a sorted row-wise selection tiling mechanism, and a sorted column-wise selection tiling mechanism.

The term "greedy thresholding tiling mechanism" may refer to a data entity that describes a tiling mechanism that is configured to select N image regions of an input image by selecting first-occurring N image regions whose color distribution ratio sets satisfy one or more color distribution ratio thresholds from an occurrence-based region sequence associated with the R image regions of the input image. In some embodiments, the greedy thresholding tiling mechanism: (i) identifies an occurrence-based region sequence associated with the R image regions of the input image, and (ii) starting from the first image region in the occurrence-based region sequence, selects those image regions that confirm to an ideal image region profile as defined by the one or more color distribution ratio thresholds until N image regions are selected. For example, consider an input image that comprises R=6 image regions: R1, R2, R3, R4, R5, and R6. If the occurrence-based region sequence six image regions is defined by the sequence {R1→R2→R3→R4→R5→R6}, and if N=4, and if R1, R2, R3, R5, and R6 conform to an ideal image region profile while R4 does not confirm to the ideal image region profile, then applying the greedy thresholding tiling mechanism to the noted input image may include the following operations: (i) determining that R1 conforms to the ideal image region profile and thus selecting R1 (which increase n to one, with n being an index variable that describes the size of the already-selected image regions), (ii) determining that R2 conforms to the ideal image region profile and thus selecting R2 (which increase n to two), (iii) determining that R3 conforms to the ideal image region profile and thus selecting R3 (which increase n to three), (iv) determining that R4 fails to conform to the ideal image region profile and thus discarding R4 (which leaves n unchanged), (v) determining that R5 conforms to the ideal image region profile and thus selecting R5 (which increase n to four), and (vi) terminating the process as n now has reached the value of N=4. In some embodiments, the color distribution ratio thresholds are generated using Otsu's method or any other appropriate technique.

The term "occurrence-based region sequence" may refer to a data entity that describes an ordering of a set of image regions based at least in part on the region position indicator for each image region. For example, in some embodiments, given an input image that comprises a set of X image horizontal rows and Y image vertical columns (where each row and each column comprises a set of image regions), then region position indicator for an ith image region may be determined based at least in part on the output of $Y_i+(X_i*Y)$, where $X_i$ is the column number of the image horizontal row within which the ith image region is located, and $Y_i$ is the column number of the image vertical column within which the ith image region is located. As another example, in some embodiments, given an input image that comprises a set of X image horizontal rows and Y image vertical columns (where each row and each column comprises a set of image regions), then region position indicator for an ith image region may be determined based at least in part on the output of $X_i+(Y_i+*X)$, where $X_i$ is the column number of the image horizontal row within which the ith image region is located, and $Y_i$ is the column number of the image vertical column within which the ith image region is located.

The term "sorted selection tiling mechanism" may refer to a data entity that describes a tiling mechanism that is configured to select N image regions of an input image by selecting first-ranked/top-ranked N image regions from a distribution-based region ranking of R image regions of the input region. In some embodiments, the sorted selection tiling mechanism: (i) identifies a distribution-based region ranking of R image regions of an input image, and (ii) selects the first N image regions from the distribution-based region ranking. For example, consider an input image that comprises R=6 image regions: R1, R2, R3, R4, R5, and R6. If the distribution-based region ranking for the six image regions is defined by the ranking {R3→R1→R4→R5→R6→R2}, and if N=4, then the sorted selection tiling mechanism may select R3, R1, R4, and R5 and may discard R6 and R2.

The term "distribution-based region ranking" may refer to a data entity that describes a ranking of R image regions that is determined based at least in part on R aggregate color distribution ratio measures for the R image regions. More specifically, for each image region, an aggregate color distribution ratio measure is generated based at least in part on one or more color distribution ratios for the image region. For example, given an ith image region that is associated with a whitespace presence ratio $W_i$ and a non-whitespace color range presence ratio $C_i$, the aggregate color distribution ratio measure for the image region may be generated based at least in part on the output of $[(w_1*C_i)-(w_2*W_i)]$, where w values may be predefined, tuned, and/or trained weight values. As another example, given an ith image region that is associated with a whitespace presence ratio $W_i$ and a nuclei-related non-whitespace color range presence ratio the aggregate color distribution ratio measure for the image region may be generated based at least in part on the output of $[(w_1*N_i)-(w_2*W_i)]$, where w values may be predefined, tuned, and/or trained weight values. As yet another example, given an ith image region that is associated with a whitespace presence ratio $W_i$ and a tissue-related non-whitespace color range presence ratio $T_i$, the aggregate color distribution ratio measure for the image region may be generated based at least in part on the output of $[(w_1*T_i)-(w_2*W_i)]$, where w values may be predefined, tuned, and/or trained weight values. As a further example, given an ith image region that is associated with a whitespace presence ratio $W_i$, a nuclei-related non-whitespace color range presence ratio $N_i$, and a tissue-related non-whitespace color range presence ratio L, the aggregate color distribution ratio measure for the image region may be generated based at least in part on the output of $[(w_1*T_i+w_2*N_i+)-(w_3*W_i)]$, where w values may be predefined, tuned, and/or trained weight values.

The term "sorted row-wise selection tiling mechanism" may refer to a data entity that describes a tiling mechanism that is configured to select, from the $R/\sqrt{N}$ image regions that are in a horizontal row of VW horizontal rows of an input image, first-ranked/top-ranked VW image regions of the $R/\sqrt{N}$ image regions of a row-wise distribution-based region ranking of image regions in the horizontal row that is generated based at least in part on each color distribution ratio set for the image regions. In some embodiments, to select N image regions of an input image that has R image regions, the sorted row-wise selection tiling mechanism: (i) identifies/generates A/TV horizontal rows of the input image, where each horizontal row is a segment of the input image that spans across the entire horizontal dimension of the input image and comprises all of the $R/\sqrt{N}$ image regions of the input image that fall within the noted segment, (ii) for each horizontal row, (a) generates a ranking of the $R/\sqrt{N}$ image regions in the horizontal row that is referred to herein as the row-wise distribution-based region ranking for the horizontal row, and (b) selects the first-ranked/top-ranked $\sqrt{N}$ image regions of the $R/\sqrt{N}$ image regions of the horizontal row according to the row-wise distribution-based region ranking for the horizontal row, and (iii) aggregates all selected $\sqrt{N}$-sized image region sets for the $\sqrt{N}$ horizontal rows to generate $\sqrt{N}*\sqrt{N}$ selected image regions. For example, consider an input image that comprises R=6 image regions: R1, R2, R3, R4, R5, and R6, where R1, R2, and R3 belong to a first horizontal row and R4, R5, and R6 belong to a second horizontal row. If the row-wise distribution-based region ranking for the first row is characterized by the ranking {R2→R3→R1} and the row-wise distribution-based region ranking for the first row is characterized by the ranking {R4→R6→R5}, and given N=4 (which means there are $\sqrt{4}=2$ rows each having $6/\sqrt{4}=6/2=3$ image regions), then the sorted row-wise selection tiling mechanism selects the four image regions by selecting $\sqrt{4}=2$ first-ranked/top-ranked image regions from {R2→R3→R1} and selecting $\sqrt{4}=2$ first-ranked/top-ranked image regions {R4→R6→R5}, thus selecting the four image regions R2, R3, R4, and R6.

The term "row-wise distribution-based region ranking" may refer to a data entity that describes a ranking of $R/\sqrt{N}$ image regions in a horizontal row that is determined based at least in part on $R/\sqrt{N}$ aggregate color distribution ratio measures for the R/VW image regions. More specifically, for each image region, an aggregate color distribution ratio measure is generated based at least in part on one or more color distribution ratios for the image region. For example, given an ith image region that is associated with a whitespace presence ratio $W_i$ and a non-whitespace color range presence ratio $C_i$, the aggregate color distribution ratio measure for the image region may be generated based at least in part on the output of $[(w_1*C_i)-(w_2*W_i)]$, where w values may be predefined, tuned, and/or trained weight values. As another example, given an ith image region that is associated with a whitespace presence ratio $W_i$ and a nuclei-related non-whitespace color range presence ratio the aggregate color distribution ratio measure for the image region may be generated based at least in part on the output of $[(w_1*N_i)-(w_2*W_i)]$, where w values may be predefined, tuned, and/or trained weight values. As yet another example, given an ith image region that is associated with a whitespace presence ratio $W_i$, and a tissue-related non-whitespace color range presence ratio $T_i$, the aggregate color distribution ratio measure for the image region may be generated based at least in part on the output of $[(w_1*T_i)-(w_2*/W_i)]$, where w values may be predefined, tuned, and/or trained weight values. As a further example, given an ith image region that is associated with a whitespace presence ratio $W_i$, a nuclei-related non-whitespace color range presence ratio and a tissue-related non-whitespace color range presence ratio L, the aggregate color distribution ratio measure for the image region may be generated based at least in part on the output of $[(w_1*T_i+w_2*N_i+)-(w_3*W_i)]$, where w values may be predefined, tuned, and/or trained weight values.

In some embodiments, once $R/\sqrt{N}$ aggregate color distribution ratio measures are generated for $R/\sqrt{N}$ corresponding image regions of a particular horizontal row of an input image, then the $R/\sqrt{N}$ image regions are ranked based at least in part on the corresponding $R/\sqrt{N}$ aggregate color distribution ratio measures. Then, the first-ranked/top-ranked $R/\sqrt{N}$ image regions within the ranking are selected as by the sorted selection tiling mechanism and aggregated to generate the respective N-sized tiled region subset for a resulting image tile. Accordingly, the sorted row-wise selection tiling mechanism is configured to generate the respective N-sized tiled region subset by: (i) selecting, from each horizontal row, and based at least in part on a row-wise distribution-based region ranking of image regions in the horizontal row that is generated based at least in part on each color distribution ratio set for the image regions, first-ranked $\sqrt{N}$ image regions.

The term "composite-tiled image prediction machine learning model" may refer to a data entity that describes parameters, hyperparameters, and/or defined operations of a machine learning model that is configured to process a given composite-tiled image to generate an image-based predictive output, such as an image-based predictive output that describes a predicted cancer type and/or a predicted cancer strain of an individual based at least in part on a composite-tiled image that is generated by applying T tiling mechanisms to a biopsy image of the noted individual. In some embodiments, the composite-tiled image prediction machine learning model comprises L layers and is configured to: (i) via the first L−1 layers, process the given composite-tiled image to generate a composite-tiled image embedding, and (ii) via the last layer, process the composite-tiled image embedding to generate the image-based predictive output. Accordingly, in some embodiments, the composite-tiled image embedding for an input image may be the output generated by a sub-ultimate layer of composite-tiled image prediction machine learning model via processing the composite-tiled image for the input image. In some embodiments, the composite-tiled image prediction machine learning model is a convolutional neural network machine learning model, such as a convolutional neural network machine learning model that is configured to process images having an $\sqrt{N}*\sqrt{N}$ size and/or having D*T image channels, where N is a region selection count hyper-parameter that is shared across T tiling mechanisms used to generate a composite-tiled image based at least in part on T tiled images for an input image, and D is a number of color model dimension of the shared color model of the T tiled images. In some of the noted embodiments, the convolutional neural network machine learning model comprises L layers and is configured to: (i) via the first L−1 layers, process the given composite-tiled image to generate a composite-tiled image embedding which is a convolutional embedding vector, and (ii) via the last layer, process the composite-tiled image embedding to generate the image-based predictive output. Accordingly, in some embodiments, the composite-tiled image embedding for an input image may be the output generated by a sub-ultimate layer of convolutional neural network machine learning model via processing the composite-tiled image for the input image.

The term "somatic mutation detection machine learning model" may refer to a data entity that describes parameters, hyperparameters, and/or defined operations of a machine learning model that is configured to process a given input genomic sequence to generate a somatic mutation prediction that describes whether the input genomic sequence comprises any somatic mutations. In some embodiments, the somatic mutation detection machine learning model comprises M layers and is configured to: (i) via the first M−1 layers, process the given input genomic sequence image to generate a genomic embedding, and (ii) via the last layer, process the genomic embedding to generate the somatic mutation prediction. In some embodiments, the somatic mutation detection machine learning model is a convolutional neural network machine learning model that comprises M layers and is configured to: (i) via the first M−1 layers, process the given input genomic sequence image to generate a genomic embedding that is a convolutional embedding vector, and (ii) via the last layer, process the genomic embedding to generate the somatic mutation prediction. Exemplary techniques for implementing and/or training convolutional somatic mutation detection machine learning models are described in Sahraeian et al., *Deep Convolutional Neural Networks for Accurate Somatic Mutation Detection*, NATURE COMMUNICATIONS (2019) 10:1041, available online at https://doi.org/10.1038/s41467-019-09027-x.

The term "hybrid input prediction machine learning model" may refer to a data entity that describes parameters, hyperparameters, and/or defined operations of a machine learning model that is configured to process the hybrid square matrix for a prediction input data object to generate a predictive output for the prediction input data object, such as a predictive output that describes a cancer type and/or a cancer strain for a particular individual that is associated with the prediction input data object (e.g., a predictive output that describes whether a prostate cancer Gleason Score for the particular individual, a predictive output that describes whether a prostate cancer Gleason Score for the particular individual is a 3+4 Gleason score or a 4+3 Gleason score, and/or the like). In some embodiments, the hybrid input prediction machine learning model is a convolutional neural network machine learning model. In some embodiments, inputs to the hybrid input prediction machine learning model comprise a vector and/or a matrix describing a hybrid square matrix, such as a V*V hybrid square matrix vector, where V is the common size of the composite-tiled image embeddings generated by a composite-tiled image prediction machine learning model and the genomic embeddings generated by a somatic mutation detection machine learning model. In some embodiments, outputs of the hybrid input prediction machine learning model comprise a vector and/or an atomic value that describes the predictive output for a prediction input data object, such as a vector that describes, for each classification label (e.g., cancer type and/or cancer strain) of a set of defined classification labels, a classification score with respect to the prediction input data object as generated by the hybrid input prediction machine learning model via processing the hybrid square matrix for the prediction input data object. In some embodiments, the hybrid input prediction machine learning model is trained based at least in part on ground-truth predictive outputs, such as ground-truth predictive outputs describing observed/confirmed cancer types and/or observed/confirmed cancer strains for a set of individuals/patients.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a scripting language, a database query or search language, and/or a report writing language. In one or more example embodiments, a software component comprising instructions in one of the foregoing examples of programming languages may be executed directly by an operating system or other software components without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid-state card (SSC), solid-state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read-only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises a combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically perform prediction-based actions based at least in part on the generated predictions. An example of a prediction-based action that can be performed using the predictive data analysis system 101 is processing a request for generating a predicted cancer type and/or a predicted cancer strain for a particular patient.

In some embodiments, the predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in several different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application-specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

As described below, various embodiments of the present invention disclose techniques that improve efficiency of performing image-based machine learning operations on large input images while limiting accuracy drawbacks of partial processing of those large input images by using composite-tiled image embeddings for composite-tiled images generated by merging multiple tiled images generated using multiple tiling mechansisms. For example, in some embodiments, given an input image that comprises R image regions, each tiled image comprises N selected image regions of the R image regions that are selected in accordance with a tiling mechanism (where N<R). In this way, given T tiling mechansisms, T tiled images are generated, and then the T tiled images are merged to generate a composite-tiled image. The composite-tiled image is then used to generate a composite-tiled image embedding that is used to generate a predictive output. In this way, by using T tiling mechansisms, various embodiments of the present invention enable reducing the size of input feature data provided to an image processing machine learning model by selecting non-holistic subsets of the image regions of an input image, while reducing accuracy drawbacks of this partial (i.e., non-holistic) processing of the input image by using multiple tiled images and multiple distinct tiling mechanisms. Reducing the size of input feature data provided to an image processing machine learning model in turn reduces the number of input processing operations that need to be performed by the noted image processing machine learning model, thus increasing computational efficiency of the image processing machine learning model. These techniques are specially useful for reducing computational efficiency of image processing machine learning models that are configured to process data associated with large images, such as large biopsy images. In this way, by using composite-tiled image embeddings for composite-tiled images generated by merging multiple tiled images generated using multiple tiling mechansisms, various embodiments of the present invention improve efficiency of performing image-based machine learning operations on large input images while limiting accuracy drawbacks of partial processing of those large input images.

FIG. 4 is a flowchart diagram of an example process 400 for generating a predictive output for a prediction input data object. Via the various steps/operations of the process 400, the predictive data analysis computing entity 106 can process a prediction input data object that comprises an input biopsy image for a particular individual and an input genomic sequence for the particular individual to generate a predictive output that describes a cancer type and/or a cancer strain for the particular individual. However, while various embodiments of the present invention describe that a predictive output can be generated using both image processing techniques described herein and genomic processing techniques described herein, a person of ordinary skill in the relevant technology will recognize that: (i) a predictive output can generated using one of the image processing techniques described herein and the genomic processing techniques described herein, (ii) a predictive output can be generated using the image processing techniques described herein and genomic processing techniques that are different from the genomic processing techniques described herein, and (iii) a predictive output can be generated using the genomic processing techniques described herein and image processing techniques that are different from the image processing techniques described herein.

The process 400 begins at step/operation 401 when the predictive data analysis computing entity 106 generates a composite-tiled image for an input image that is associated with the prediction input data object. In some embodiments, the prediction input data object comprises input data associated with a predictive entity with respect to which one or more predictive data analysis operations are performed to generate a predictive output. For example, in some embodiments, the prediction input data object comprise at least one of an input biopsy image for a particular individual and an input genomic sequence for a particular individual, where at least one of the input biopsy image and the input genomic sequence is used to generate a predictive output for the particular individual, such as a predictive output that describes a cancer type and/or a cancer strain for the particular individual (e.g., a predictive output that describes whether a prostate cancer Gleason Score for the particular individual, a predictive output that describes whether a prostate cancer Gleason Score for the particular individual is a 3+4 Gleason score or a 4+3 Gleason score, and/or the like).

In some embodiments, to generate a composite-tiled image for an input image, T tiled images are generated based at least in part on the input image. Each tiled image may be an image that comprises N image regions of a corresponding input image, where the N image regions that are in a tiled image (also referred to herein as the "N-sized tiled region subset" for the tiled image) are selected from the image regions of the corresponding image in accordance with a respective tiling mechanism that is associated with the tiled image. In some embodiments, given an input image that comprises R image regions (e.g., R image pixels, R fixed-size box regions of the input image, R fixed-size box regions of the input image that are generated via moving a fixed-size box frame across and along the input image in a continuous manner, and/or the like), to generate a particular tiled image for the input image, N of the R image regions are selected in accordance with a particular tiling mechanism that is associated with the particular tiled image, and then the N selected image regions are included in the particular tiled image (e.g., a $\sqrt{N}*\sqrt{N}$ tiled image), where N<R. In some of the noted embodiments, given T tiled images that are generated based at least in part on TN-sized tiled region subset of the R image regions and in accordance with T tiling mechanisms, the T tiled images are merged into a composite-tiled image, such as a composite-tiled image that comprises T*D image channels, where T is the number of tiled images (and hence the number of applied tiling mechanisms), while D is the number of color model dimensions of a shared color model of the T tiled images. For example, if the T tiled images comprise three tiled images each associated with a Red-Green-Blue (RGB) color model, given T=3 and D=3 (e.g., with the three color model dimensions being the red dimension, the green dimension, and the blue dimension), then the composite-tiled image may be an image with 3*3=9 image channels.

In some embodiments, step/operation 401 may be performed in accordance with the process that is depicted in FIG. 5, which depicts a flowchart diagram of an example process for generating a composite-tiled image for an input image. The process that is depicted in FIG. 5 begins at step/operation 501 when the predictive data analysis computing entity 106 identifies R image regions of the input image. For example, in some embodiments, to generate the R image regions, the predictive data analysis computing entity 106 continuously moves a fixed-size box frame across and along the input image. In some embodiments, to generate the R image regions, the predictive data analysis computing entity 106: (i) converts the input image into a defined mode (e.g., a portrait mode), and (ii) continuously moves a fixed-size box frame across and along the input image to generate R fixed-size box regions captured by the movement of the fixed-size box frame. An operational example of generating an image region for an input biopsy image is depicted in FIG. 6. As depicted in FIG. 6, image regions are generated by: (i) converting the input biopsy image 601 into a portrait mode image 611, and (ii) continuously moving a fixed-size box frame 621 across and along the portrait mode image 611 to generate the resulting image regions.

At step/operation 502, the predictive data analysis computing entity 106 generates, for each image region, a color distribution ratio set that describes one or more color distribution ratios for the image region. A color distribution ratio may be a value that describes a ratio of the area covered by a corresponding image region that is occupied by a particular color range that is associated with the color distribution ratio. An example of a color distribution ratio may be a whitespace presence ratio that describes a ratio of the area covered by a corresponding image region that is occupied by whitespace content (i.e., by content having a white color), a non-whitespace color range presence ratio that describes a ratio of the area covered by a corresponding image that is occupied by a non-whitespace color region, and/or the like. For example, in some embodiments, the color distribution ratios for a particular image region include: (i) a whitespace presence ratio that describes a ratio of the area covered by the particular image region that is occupied by whitespace content, (ii) a light non-whitespace presence ratio that describes a ratio of the area covered by the particular image region that is covered by a color range that describes a set of lighter non-whitespace covers, and (iii) a dark non-whitespace presence ratio that describes a ratio of the area covered by the particular image region that is covered by a color range that describes a set of darker non-whitespace covers. As another example, in some embodiments, given an input biopsy image, the color distribution ratios for a particular image region of the input biopsy image include: (i) a whitespace presence ratio that describes a ratio of the area covered by the particular image region that is occupied by whitespace content, (ii) a tissue presence ratio that describes a ratio of the area covered by the particular image region that is covered by a color range that corresponds to tissue depictions, and (iii) a nuclei tissue presence ratio that describes a ratio of the area covered by the particular image region that is covered by a color range that corresponds to nuclei depictions. In some embodiments, the color distribution ratio set for an image region comprises: (i) a whitespace presence ratio for the image region, and (ii) one or more non-whitespace color range presence ratios for the image region with respect to one or more non-whitespace color ranges. In some embodiments (e.g., given a biopsy image), the one or more non-whitespace color ranges comprise a first non-whitespace color range that is associated with nuclei depiction within the biopsy image and a second non-whitespace color range that is associated with tissue depiction within the biopsy image.

At step/operation 503, the predictive data analysis computing entity 106 generates T tiled images using T tiling mechanisms. As described above, a tiling mechanism may comprise a set of rules for selecting N image regions from R image regions of an input image, where N<R. In some embodiments, applying a tiling mechanism to an input image causes generating a respective N-sized tiled region subset of the R image regions of the input image, where the image regions in the respective N-sized tiled region subset may be used to generate a tiled image (e.g., a $\sqrt{N}*\sqrt{N}$ tiled image). Importantly, in some embodiments, given T tiling mechanisms, all of the T tiling mechanisms select N image regions for inclusion in a resulting tiled image, where N may be defined by region selection count hyper-parameter that is shared across the T tiling mechanisms. Examples of tiling mechanisms include a greedy thresholding tiling mechanism, a sorted selection tiling mechanism, a sorted row-wise selection tiling mechanism, and a sorted column-wise selection tiling mechanism. An operational example of a tiled image 801 generated using the greedy thresholding tiling mechanism, a tiled image 802 generated using the sorted row-wise selection tiling mechanism, and a tiled image 803 generated using the sorted row-wise selection tiling mechanism is depicted in FIG. 8.

In some embodiments, a greedy thresholding tiling mechanism is configured to select N image regions of an input image by selecting first-occurring N image regions whose color distribution ratio sets satisfy one or more color distribution ratio thresholds from an occurrence-based region sequence associated with the R image regions of the input image. In some embodiments, the greedy thresholding tiling mechanism: (i) identifies an occurrence-based region sequence associated with the R image regions of the input image, and (ii) starting from the first image region in the occurrence-based region sequence, selects those image regions that confirm to an ideal image region profile as defined by the one or more color distribution ratio thresholds until N image regions are selected.

For example, consider an input image that comprises R=6 image regions: R1, R2, R3, R4, R5, and R6. If the occurrence-based region sequence six image regions is defined by the sequence {R1→R2→R3→R4→R5→R6}, and if N=4, and if R1, R2, R3, R5, and R6 conform to an ideal image region profile while R4 does not confirm to the ideal image region profile, then applying the greedy thresholding tiling mechanism to the noted input image may include the following operations: (i) determining that R1 conforms to the ideal image region profile and thus selecting R1 (which increase n to one, with n being an index variable that describes the size of the already-selected image regions), (ii) determining that R2 conforms to the ideal image region profile and thus selecting R2 (which increase n to two), (iii) determining that R3 conforms to the ideal image region profile and thus selecting R3 (which increase n to three), (iv) determining that R4 fails to conform to the ideal image region profile and thus discarding R4 (which leaves n unchanged), (v) determining that R5 conforms to the ideal image region profile and thus selecting R5 (which increase n to four), and (vi) terminating the process as n now has reached the value of N=4.

Accordingly, to apply the greedy thresholding tiling mechanism to an input image, the predictive data analysis computing entity 106 may first generate an occurrence-based region sequence of the R image regions of the input image. The occurrence-based region sequence may be an ordering of a set of image regions based at least in part on the region position indicator for each image region. For example, in some embodiments, given an input image that comprises a set of X image horizontal rows and Y image vertical columns (where each row and each column comprises a set of image regions), then region position indicator for an ith image region may be determined based at least in part on the output of $Y_i+(X_i*Y)$, where $X_i$ is the column number of the image horizontal row within which the ith image region is located, and $Y_i$ is the column number of the image vertical column within which the ith image region is located. As another example, in some embodiments, given an input image that comprises a set of X image horizontal rows and Y image vertical columns (where each row and each column comprises a set of image regions), then region position indicator for an ith image region may be determined based at least in part on the output of $X_i+(Y_i*X)$, where $X_i$ is the column number of the image horizontal row within which the ith image region is located, and $Y_i$ is the column number of the image vertical column within which the ith image region is located.

In some embodiments, determining whether an image region conforms to an ideal image profile is determined based at least in part on whether the color distribution ratio set for the image region satisfies one or more color distribution ratio thresholds. For example, in some embodiments, the configuration data for the predictive data analysis system 101 may describe that an image region conforms to an ideal image profile if: (i) the whitespace presence ratio for the image region satisfies (e.g., falls below) a whitespace presence ratio threshold, and (ii) a non-whitespace presence ratio describing a ratio of area occupied by all non-whitespace content of the image region to the total area of the image region satisfies (e.g., exceeds) non-whitespace presence ratio threshold. As another example, in some embodiments, the configuration data for the predictive data analysis system 101 may describe that an image region conforms to an ideal image profile if: (i) the whitespace presence ratio for the image region satisfies (e.g., falls below) a whitespace presence ratio threshold, and (ii) a nuclei-related non-whitespace color range presence ratio that is associated with a non-whitespace color range for nuclei depiction within the image region satisfies (e.g., exceeds) a nuclei-related non-whitespace color range presence ratio threshold. As yet another example, in some embodiments, the configuration data for the predictive data analysis system 101 may describe that an image region conforms to an ideal image profile if: (i) the whitespace presence ratio for the image region satisfies (e.g., falls below) a whitespace presence ratio threshold, and (ii) a tissue-related non-whitespace color range presence ratio that is associated with a non-whitespace color range for tissue depiction within the image region satisfies (e.g., exceeds) a tissue-related non-whitespace color range presence ratio threshold. As a further example, in some embodiments, the configuration data for the predictive data analysis system 101 may describe that an image region conforms to an ideal image profile if: (i) the whitespace presence ratio for the image region satisfies (e.g., falls below) a whitespace presence ratio threshold, (ii) a nuclei-related non-whitespace color range presence ratio that is associated with a non-whitespace color range for nuclei depiction within the image region satisfies (e.g., exceeds) a nuclei-related non-whitespace color range presence ratio threshold, and (iii) a tissue-related non-whitespace color range presence ratio that is associated with a non-whitespace color range for tissue depiction within the image region satisfies (e.g., exceeds) a tissue-related non-whitespace color range presence ratio threshold. As an additional example, in some embodiments, the configuration data for the predictive data analysis system 101 may describe that an image region conforms to an ideal image profile if: (i) the whitespace presence ratio for the image region satisfies (e.g., falls below) a whitespace presence ratio threshold, and (ii) non-whitespace color range presence ratio describing a ratio of area occupied by all nuclei content depiction and tissue content depiction in the image region to the total area of the image region satisfies (e.g., exceeds) non-whitespace presence ratio threshold.

In some embodiments, a sorted selection tiling mechanism is configured to select N image regions of an input image by selecting first-ranked/top-ranked N image regions from a distribution-based region ranking of R image regions of the input region. In some embodiments, the sorted selection tiling mechanism: (i) identifies a distribution-based region ranking of R image regions of an input image, and (ii) selects the first N image regions from the distribution-based region ranking. For example, consider an input image that comprises R=6 image regions: R1, R2, R3, R4, R5, and R6. If the distribution-based region ranking for the six image regions is defined by the ranking {R3→R1→R4→R5→R6→R2}, and if N=4, then the sorted selection tiling mechanism may select R3, R1, R4, and R5 and may discard R6 and R2.

In some embodiments, a distribution-based region ranking is a ranking of R image regions that is determined based at least in part on R aggregate color distribution ratio measures for the R image regions. More specifically, for each image region, an aggregate color distribution ratio measure is generated based at least in part on one or more color distribution ratios for the image region. For example, given an ith image region that is associated with a whitespace presence ratio $W_i$ and a non-whitespace color range presence ratio $C_i$, the aggregate color distribution ratio measure for the image region may be generated based at least in part on the output of $[(w_1*C_i)-(w_2*W_i)]$, where w values may be predefined, tuned, and/or trained weight values. As another example, given an ith image region that is associated with a whitespace presence ratio $W_i$ and a nuclei-related non-whitespace color range presence ratio $N_i$, the aggregate color distribution ratio measure for the image region may be generated based at least in part on the output of $[(w_1*N_i)-(w_2*W_i)]$, where w values may be predefined, tuned, and/or trained weight values. As yet another example, given an ith image region that is associated with a whitespace presence ratio $W_i$ and a tissue-related non-whitespace color range presence ratio $T_i$, the aggregate color distribution ratio measure for the image region may be generated based at least in part on the output of $[(w_1*T_i)-(w_2*W_i)]$, where w values may be predefined, tuned, and/or trained weight values. As a further example, given an ith image region that is associated with a whitespace presence ratio $W_i$, a nuclei-related non-whitespace color range presence ratio $N_i$, and a tissue-related non-whitespace color range presence ratio $T_i$ the aggregate color distribution ratio measure for the image region may be generated based at least in part on the output of $[(w_1*T_i+w_2*N_i)-(w_3*W_i)]$, where w values may be predefined, tuned, and/or trained weight values.

In some embodiments, once R aggregate color distribution ratio measures are generated for R corresponding image regions of an input image, then the R image regions are ranked based at least in part on the corresponding R aggregate color distribution ratio measures. Then, the first-ranked/top-ranked N image regions within the ranking are selected as the respective N-sized tiled region subset for an image tile that is associated with a sorted selection tiling mechanism. Accordingly, the sorted selection tiling mechanism is configured to generate the respective N-sized tiled region subset by selecting, from a distribution-based region ranking of the plurality of image regions that is generated based at least in part on each color distribution ratio set for the plurality of image regions, first-ranked/top-ranked N image regions.

In some embodiments, a sorted row-wise selection tiling mechanism is configured to generate, from the $R/\sqrt{N}$ image regions that are in a horizontal row of $\sqrt{N}$ horizontal rows of an input image, first-ranked/top-ranked VW image regions of the $R/\sqrt{N}$ image regions of a row-wise distribution-based region ranking of image regions in the horizontal row that is generated based at least in part on each color distribution ratio set for the image regions. In some embodiments, to select N image regions of an input image that has R image regions, the sorted row-wise selection tiling mechanism: (i) identifies/generates $R/\sqrt{N}$ horizontal rows of the input image, where each horizontal row is a segment of the input image that spans across the entire horizontal dimension of the input image and comprises all of the $R/\sqrt{N}$ image regions of the input image that fall within the noted segment, (ii) for each horizontal row, (a) generates a ranking of the $R/\sqrt{N}$ image regions in the horizontal row that is referred to herein as the row-wise distribution-based region ranking for the horizontal row, and (b) selects the first-ranked/top-ranked VW image regions of the $R/\sqrt{N}$ image regions of the horizontal row according to the row-wise distribution-based region ranking for the horizontal row, and (iii) aggregates all selected $\sqrt{N}$-sized image region sets for the $\sqrt{N}$ horizontal rows to generate $\sqrt{N} * \sqrt{N} = N$ selected image regions.

For example, consider an input image that comprises R=6 image regions: R1, R2, R3, R4, R5, and R6, where R1, R2, and R3 belong to a first horizontal row and R4, R5, and R6 belong to a second horizontal row. If the row-wise distribution-based region ranking for the first row is characterized by the ranking {R2→R3→R1} and the row-wise distribution-based region ranking for the first row is characterized by the ranking {R4→R6→R5}, and given N 4 (which means there are $\sqrt{4}=2$ rows each having $6/\sqrt{4}=6/2=3$ image regions), then the sorted row-wise selection tiling mechanism selects the four image regions by selecting $\sqrt{4}=2$ first-ranked/top-ranked image regions from {R2→R3→R1} and selecting $\sqrt{4}=2$ first-ranked/top-ranked image regions {R4→R6→R5}, thus selecting the four image regions R2, R3, R4, and R6.

In some embodiments, a row-wise distribution-based region ranking is a ranking of RAN image regions in a horizontal row that is determined based at least in part on $R/\sqrt{N}$ aggregate color distribution ratio measures for the $R/\sqrt{N}$ image regions. More specifically, for each image region, an aggregate color distribution ratio measure is generated based at least in part on one or more color distribution ratios for the image region. For example, given an ith image region that is associated with a whitespace presence ratio $W_i$ and a non-whitespace color range presence ratio $C_i$, the aggregate color distribution ratio measure for the image region may be generated based at least in part on the output of $[(w_1*C_i)-(w_2*W_i)]$, where w values may be predefined, tuned, and/or trained weight values. As another example, given an ith image region that is associated with a whitespace presence ratio $W_i$ and a nuclei-related non-whitespace color range presence ratio the aggregate color distribution ratio measure for the image region may be generated based at least in part on the output of $[(w_1*N_i)-(w_2*W_i)]$, where w values may be predefined, tuned, and/or trained weight values. As yet another example, given an ith image region that is associated with a whitespace presence ratio $W_i$ and a tissue-related non-whitespace color range presence ratio L, the aggregate color distribution ratio measure for the image region may be generated based at least in part on the output of $[(w_i*T_i)-(w_2/W_i)]$, where w values may be predefined, tuned, and/or trained weight values. As a further example, given an ith image region that is associated with a whitespace presence ratio $W_i$, a nuclei-related non-whitespace color range presence ratio $N_i$, and a tissue-related non-whitespace color range presence ratio $T_i$, the aggregate color distribution ratio measure for the image region may be generated based at least in part on the output of $[(w_1*T_i+w_2*N_i+)-(w_3*W_i)]$, where w values may be predefined, tuned, and/or trained weight values.

In some embodiments, once $R/\sqrt{N}$ aggregate color distribution ratio measures are generated for $R/\sqrt{N}$ corresponding image regions of a particular horizontal row of an input image, then the $R/\sqrt{N}$ image regions are ranked based at least in part on the corresponding $R/\sqrt{N}$ aggregate color distribution ratio measures. Then, the first-ranked/top-ranked $R/\sqrt{N}$ image regions within the ranking are selected as by the sorted selection tiling mechanism and aggregated to generate the respective N-sized tiled region subset for a resulting image tile. Accordingly, the sorted row-wise selection tiling mechanism is configured to generate the respective N-sized tiled region subset by: (i) selecting, from each horizontal row, and based at least in part on a row-wise distribution-based region ranking of image regions in the horizontal row that is generated based at least in part on each color distribution ratio set for the image regions, first-ranked $\sqrt{N}$ image regions.

In some embodiments, a sorted column-wise selection tiling mechanism is configured to generate, from the $R/\sqrt{N}$ image regions that are in a horizontal column of $\sqrt{N}$ horizontal columns of an input image, first-ranked/top-ranked $\sqrt{N}$ image regions of the $R/\sqrt{N}$ image regions of a column-wise distribution-based region ranking of $\sqrt{N}$ image regions in the horizontal column that is generated based at least in part on each color distribution ratio set for the $\sqrt{N}$ image regions. In some embodiments, to select N image regions of an input image that has R image regions, the sorted column-wise selection tiling mechanism: (i) identifies/generates $\sqrt{N}$ horizontal columns of the input image, where each horizontal column is a segment of the input image that spans across the entire horizontal dimension of the input image and comprises all of the $R/\sqrt{N}$ image regions of the input image that fall within the noted segment, (ii) for each horizontal column, (a) generates a ranking of the $R/\sqrt{N}$ image regions in the horizontal column that is referred to herein as the column-wise distribution-based region ranking for the horizontal column, and (b) selects the first-ranked/top-ranked $A/\sqrt{N}$ image regions of the $R/\sqrt{N}$ image regions of the horizontal column according to the column-wise distribution-based region ranking for the horizontal column, and (iii) aggregates all selected $\sqrt{N}$-sized image region sets for the $\sqrt{N}$ horizontal columns to generate $\sqrt{N}*\sqrt{N}=N$ selected image regions.

For example, consider an input image that comprises R=6 image regions: R1, R2, R3, R4, R5, and R6, where R1, R2, and R3 belong to a first horizontal column and R4, R5, and R6 belong to a second horizontal column. If the column-wise distribution-based region ranking for the first column is characterized by the ranking {R2→R3→R1} and the column-wise distribution-based region ranking for the first column is characterized by the ranking {R4→R6→R5}, and given N=4 (which means there are $\sqrt{4}$=2 columns each having $6/\sqrt{4}$=6/2=3 image regions), then the sorted column-wise selection tiling mechanism selects the four image regions by selecting $\sqrt{4}$=2 first-ranked/top-ranked image regions from {R2→R3→R1} and selecting $\sqrt{4}$=2 first-ranked/top-ranked image regions {R4→R6→R5}, thus selecting the four image regions R2, R3, R4, and R6.

In some embodiments, a column-wise distribution-based region ranking is a ranking of $R/\sqrt{W}$ image regions in a horizontal column that is determined based at least in part on $R/\sqrt{W}$ aggregate color distribution ratio measures for the $R/\sqrt{W}$ image regions. More specifically, for each image region, an aggregate color distribution ratio measure is generated based at least in part on one or more color distribution ratios for the image region. For example, given an ith image region that is associated with a whitespace presence ratio $W_i$ and a non-whitespace color range presence ratio $C_i$, the aggregate color distribution ratio measure for the image region may be generated based at least in part on the output of $[(w_1*C_i)-(w_2*W_i)]$, where w values may be predefined, tuned, and/or trained weight values. As another example, given an ith image region that is associated with a whitespace presence ratio $W_i$ and a nuclei-related non-whitespace color range presence ratio the aggregate color distribution ratio measure for the image region may be generated based at least in part on the output of $[(w_1*N_i)-(w_2*W_i)]$, where w values may be predefined, tuned, and/or trained weight values. As yet another example, given an ith image region that is associated with a whitespace presence ratio $W_i$ and a tissue-related non-whitespace color range presence ratio L, the aggregate color distribution ratio measure for the image region may be generated based at least in part on the output of $[(w_1*T_i)-(w_2*W_i)]$, where w values may be predefined, tuned, and/or trained weight values. As a further example, given an ith image region that is associated with a whitespace presence ratio $W_i$, a nuclei-related non-whitespace color range presence ratio $N_i$, and a tissue-related non-whitespace color range presence ratio $T_i$, the aggregate color distribution ratio measure for the image region may be generated based at least in part on the output of $[(w_1*T_i+w_2*N_i+)-(w_3*W_i)]$, where w values may be predefined, tuned, and/or trained weight values.

In some embodiments, once $R/\sqrt{N}$ aggregate color distribution ratio measures are generated for $R/\sqrt{N}$ corresponding image regions of a particular horizontal column of an input image, then the $R/\sqrt{N}$ image regions are ranked based at least in part on the corresponding $R/\sqrt{N}$ aggregate color distribution ratio measures. Then, the first-ranked/top-ranked $R/\sqrt{N}$ image regions within the ranking are selected as by the sorted selection tiling mechanism and aggregated to generate the respective N-sized tiled region subset for a resulting image tile. Accordingly, the sorted column-wise selection tiling mechanism is configured to generate the respective N-sized tiled region subset by: (i) selecting, from each horizontal column, and based at least in part on a column-wise distribution-based region ranking of $\sqrt{N}$ image regions in the horizontal column that is generated based at least in part on each color distribution ratio set for the $\sqrt{N}$ image regions, first-ranked $\sqrt{N}$ image regions.

Returning to FIG. 5, at step/operation 504, the predictive data analysis computing entity 106 generates the composite-tiled image by combining the T tiled images. A composite-tiled image is an image that is captured by clubbing tiled images each generated based at least in part on a respective N-sized tiled region subset of the set of image regions of a corresponding input that is selected in accordance with the respective tiling mechanism for the tiled image. In some embodiments, a composite-tiled image that comprises T*D image channels, where T is the number of tiled images (and hence the number of applied tiling mechanisms), while D is the number of color model dimensions of a shared color model of the T tiled images. For example, if the T tiled images comprise three tiled images each associated with a Red-Green-Blue (RGB) color model, given T=3 and D=3 (e.g., with the three color model dimensions being the red dimension, the green dimension, and the blue dimension), then the composite-tiled image may be an image with 3*3=9 image channels.

Returning to FIG. 4, at step/operation 402, the predictive data analysis computing entity 106 generates a composite-tiled image embedding for the input image using a composite-tiled image prediction machine learning model and based at least in part on the composite-tiled image for the input image. In some embodiments, the composite-tiled image prediction machine learning model is configured to process a given composite-tiled image to generate an image-based predictive output, such as an image-based predictive output that describes a predicted cancer type and/or a predicted cancer strain of an individual based at least in part on a composite-tiled image that is generated by applying T tiling mechanisms to a biopsy image of the noted individual. In some embodiments, the composite-tiled image prediction machine learning model comprises L layers and is configured to: (i) via the first L−1 layers, process the given composite-tiled image to generate a composite-tiled image embedding, and (ii) via the last layer, process the composite-tiled image embedding to generate the image-based predictive output. Accordingly, in some embodiments, the composite-tiled image embedding for an input image may be the output generated by a sub-ultimate layer of composite-tiled image prediction machine learning model via processing the composite-tiled image for the input image. An operational example of a composite-tiled image prediction machine learning model 900 that can be used to generate a composite-tiled image embedding 901 for a composite-tiled image 902 is depicted in FIG. 9.

In some embodiments, the composite-tiled image prediction machine learning model is a convolutional neural network machine learning model, such as a convolutional neural network machine learning model that is configured to process images having an $\sqrt{N}*\sqrt{N}$ size and/or having D*T image channels, where N is a region selection count hyper-parameter that is shared across T tiling mechanisms used to generate a composite-tiled image based at least in part on T tiled images for an input image, and D is a number of color model dimension of the shared color model of the T tiled images. In some of the noted embodiments, the convolutional neural network machine learning model comprises L layers and is configured to: (i) via the first L−1 layers, process the given composite-tiled image to generate a composite-tiled image embedding which is a convolutional embedding vector, and (ii) via the last layer, process the composite-tiled image embedding to generate the image-based predictive output. Accordingly, in some embodiments, the composite-tiled image embedding for an input image may be the output generated by a sub-ultimate layer of convolutional neural network machine learning model via processing the composite-tiled image for the input image.

As described above, in some embodiments, composite-tiled image embeddings are generated by a penultimate layer of a composite-tiled image prediction machine learning model, while the output of the ultimate layer of the composite-tiled image prediction machine learning model is a particular image-based predictive output (e.g., a classification predictive output). This enables training the composite-tiled image prediction machine learning model on a secondary training task for which training data is available instead of on an embedding task, while still using an intermediate output of the composite-tiled image prediction machine learning model as an embedding output. For example, in some embodiments, the composite-tiled image prediction machine learning model can be trained based at least in part on ground-truth data about observed/confirmed cancer types and/or observed/confirmed cancer strains for particular individuals. After training, the final layer of the trained model can be removed, and the outputs of the sub-ultimate layer of the trained model can be used as composite-tiled image embeddings. In some embodiments, inputs to a composite-tiled image prediction machine learning model include a three-dimensional tensor describing a composite-tiled image embedding for an input image, such as a three dimensional tensor whose first dimension is D, whose second dimension is T, and whose third dimension is $\sqrt{N}*\sqrt{N}$, where N is a region selection count hyper-parameter that is shared across T tiling mechanisms used to generate the composite-tiled image based at least in part on T tiled images for the input image, and D is a number of color model dimension of the shared color model of the T tiled images. In some embodiments, outputs of a composite-tiled image prediction machine learning model include a vector describing a composite-tiled image embedding for an input image.

Returning to FIG. 4, at step/operation 403, the predictive data analysis computing entity 106 generates a genomic embedding for the prediction input data object based at least in part on an input genomic sequence that is a part of the prediction input data object and using a somatic mutation detection machine learning model. The somatic mutation detection machine learning model may be configured to process a given input genomic sequence to generate a somatic mutation prediction that describes whether the input genomic sequence comprises any somatic mutations. In some embodiments, the somatic mutation detection machine learning model comprises M layers and is configured to: (i) via the first M−1 layers, process the given input genomic sequence image to generate a genomic embedding, and (ii) via the last layer, process the genomic embedding to generate the somatic mutation prediction. In some embodiments, the somatic mutation detection machine learning model is a convolutional neural network machine learning model that comprises M layers and is configured to: (i) via the first M−1 layers, process the given input genomic sequence image to generate a genomic embedding that is a convolutional embedding vector, and (ii) via the last layer, process the genomic embedding to generate the somatic mutation prediction. Exemplary techniques for implementing and/or training convolutional somatic mutation detection machine learning models are described in Sahraeian et al., *Deep Convolutional Neural Networks for Accurate Somatic Mutation Detection*, NATURE COMMUNICATIONS (2019) 10:1041, available online at https://doi.org/10.1038/s41467-019-09027-x.

As described above, in some embodiments, genomic embeddings are generated by a penultimate layer of a somatic mutation detection machine learning model, while the output of the ultimate layer of the somatic mutation detection machine learning model is a somatic mutation prediction. In some embodiments, somatic mutation detection machine learning model can be trained based at least in part on ground-truth data about observed/confirmed somatic mutation predictions (e.g., at least one of observed/confirmed mutation type classifications, observed/confirmed mutation length classifications, observed/confirmed mutation position predictions, and/or the like). After training, the final layer of the trained model can be removed, and the outputs of the sub-ultimate layer of the trained model can be used as genomic embeddings. In some embodiments, inputs to a somatic mutation detection machine learning model include a vector representation and/or a matrix representation of genomic sequence data. In some embodiments, outputs of a somatic mutation detection machine learning model include a vector describing a genomic embedding for a genomic sequence. In some embodiments, the size of the composite-tiled image embeddings generated by the composite-tiled image prediction machine learning model and the genomic embeddings generated by the somatic mutation detection machine learning model are identical.

Returning to FIG. 4, at step/operation 404, the predictive data analysis computing entity 106 generates a hybrid square matrix for the prediction input data object based at least in part on at least one of the composite-tiled image embedding and the genomic embedding. In some embodiments, the hybrid square matrix is a fixed-size representation of a prediction input data object that is generated based at least in part on or more fixed-size representations of the prediction input data object. For example, the hybrid square matrix for a prediction input data object that comprises an input image and an input genomic sequence may be generated based at least in part on at least one of the composite-tiled image embedding for the input image and the genomic embedding for the input genomic sequence. In some of the noted embodiments, given a prediction input data object that is associated with a composite-tiled image embedding $E_1$ and a genomic embedding $E_2$ (where the two embeddings may have the identical size), then the hybrid square matrix for the prediction input data object may be generated based at least in part on the output of performing an outer product operation on the two embeddings, which is a matrix.

At step/operation 405, the predictive data analysis computing entity 106 generates the predictive output using a hybrid input prediction machine learning model and based at least in part on the hybrid square matrix. In some embodiments, the hybrid input prediction machine learning model is configured to process the hybrid square matrix for a prediction input data object to generate a predictive output for the prediction input data object, such as a predictive output that describes a cancer type and/or a cancer strain for a particular individual that is associated with the prediction input data object (e.g., a predictive output that describes whether a prostate cancer Gleason Score for the particular individual, a predictive output that describes whether a prostate cancer Gleason Score for the particular individual is a 3+4 Gleason score or a 4+3 Gleason score, and/or the like). In some embodiments, the hybrid input prediction machine learning model is a convolutional neural network machine learning model.

In some embodiments, inputs to the hybrid input prediction machine learning model comprise a vector and/or a matrix describing a hybrid square matrix, such as a V*V hybrid square matrix vector, where V is the common size of the composite-tiled image embeddings generated by a composite-tiled image prediction machine learning model and the genomic embeddings generated by a somatic mutation detection machine learning model. In some embodiments, outputs of the hybrid input prediction machine learning model comprise a vector and/or an atomic value that describes the predictive output for a prediction input data object, such as a vector that describes, for each classification label (e.g., cancer type and/or cancer strain) of a set of defined classification labels, a classification score with respect to the prediction input data object as generated by the hybrid input prediction machine learning model via processing the hybrid square matrix for the prediction input data object. In some embodiments, the hybrid input prediction machine learning model is trained based at least in part on ground-truth predictive outputs, such as ground-truth predictive outputs describing observed/confirmed cancer types and/or observed/confirmed cancer strains for a set of individuals/patients. At step/operation 406, the predictive data analysis computing entity 106 performs one or more prediction-based actions based at least in part on the predictive output. For example, the predictive data analysis computing entity 106 may be configured to generate one or more physician alerts and/or one or more healthcare alerts based at least in part on the selected subset of the plurality of candidate predictive recommendations. As another example, the predictive data analysis computing entity 106 may be configured to generate one or more automated physician appointments, automated medical notes, automated prescription medications, automated physician instruction, and/ or the like based at least in part on the selected subset of the plurality of candidate predictive recommendations. In some embodiments, the predictive data analysis computing entity 106 may be configured to generate user interface data for display using a display device of a computing entity (e.g., client computing entity 102). For example, in some embodiments, the predictive data analysis computing entity 106 generates user interface data for one or more recommendations (e.g., referrals) based at least in part on the selected subset of the plurality of candidate predictive recommendations. In some embodiments, performing the prediction-based actions comprises generating user interface data for a prediction output user interface that displays predicted scores for a patient based at least in part on the predictive output for the patient. An operational example of such a prediction output user interface 700 is depicted in FIG. 7.

In some embodiments, performing the prediction-based actions includes performing operational load balancing for the post-prediction systems that perform post-prediction operations (e.g., automated specialist appointment scheduling operations) based at least in part on predictive outputs. For example, in some embodiments, a predictive data analysis computing entity determines D classifications for D prediction input data objects based at least in part on the D predictive outputs for the for D prediction input data objects. Then, the count of D prediction input data objects that are associated with an affirmative classification, along with a resource utilization ratio for each prediction input data objects, can be used to predict a predicted number of computing entities needed to perform post-prediction processing operations with respect to the D prediction input data objects. For example, in some embodiments, the number of computing entities needed to perform post-prediction processing operations (e.g., automated specialist scheduling operations) with respect to D prediction input data objects can be determined based at least in part on the output of the equation: $R = \text{ceil}(\Sigma_k^{k=K} \text{ur}_k)$, where R is the predicted number of computing entities needed to perform post-prediction processing operations with respect to the D prediction input data objects, ceil(·) is a ceiling function that returns the closest integer that is greater than or equal to the value provided as the input parameter of the ceiling function, k is an index variable that iterates over K prediction input data objects among the D prediction input data objects that are associated with affirmative classifications, and $ur_k$ is the estimated resource utilization ratio for a kth prediction input data object that may be determined based at least in part on a patient history complexity of a patient associated with the prediction input data object. In some embodiments, once R is generated, a predictive data analysis computing entity can use R to perform operational load balancing for a server system that is configured to perform post-prediction processing operations with respect to D prediction input data objects. This may be done by allocating computing entities to the post-prediction processing operations if the number of currently-allocated computing entities is below R, and deallocating currently-allocated computing entities if the number of currently-allocated computing entities is above R.

Accordingly, as described below, various embodiments of the present invention disclose techniques that improve efficiency of performing image-based machine learning operations on large input images while limiting accuracy drawbacks of partial processing of those large input images by using composite-tiled image embeddings for composite-tiled images generated by merging multiple tiled images generated using multiple tiling mechansisms. For example, in some embodiments, given an input image that comprises R image regions, each tiled image comprises N selected image regions of the R image regions that are selected in accordance with a tiling mechanism (where N<R). In this way, given T tiling mechansisms, T tiled images are generated, and then the T tiled images are merged to generate a composite-tiled image. The composite-tiled image is then used to generate a composite-tiled image embedding that is used to generate a predictive output. In this way, by using T tiling mechansisms, various embodiments of the present invention enable reducing the size of input feature data provided to an image processing machine learning model by selecting non-holistic subsets of the image regions of an input image, while reducing accuracy drawbacks of this partial (i.e., non-holistic) processing of the input image by using multiple tiled images and multiple distinct tiling mechanisms. Reducing the size of input feature data provided to an image processing machine learning model in turn reduces the number of input processing operations that need to be performed by the noted image processing machine learning model, thus increasing computational efficiency of the image processing machine learning model. These techniques are specially useful for reducing computational efficiency of image processing machine learning models that are configured to process data associated with large images, such as large biopsy images. In this way, by using composite-tiled image embeddings for composite-tiled images generated by merging multiple tiled images generated using multiple tiling mechansisms, various embodiments of the present invention improve efficiency of performing image-based machine learning operations on large input images while limiting accuracy drawbacks of partial processing of those large input images.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for generating a predictive output for a prediction input data object that comprises an input image comprising a plurality of image regions, the computer-implemented method comprising:

for each image region in the plurality of image regions, generating, by one or more processors, a color distribution ratio set that comprises: (i) a whitespace presence ratio for the image region, and (ii) one or more non-whitespace color range presence ratios for the image region with respect to one or more non-whitespace color ranges;

generating, by the one or more processors, a plurality of tiled images for the input image, wherein: (i) each tiled image in the plurality of tiled images is associated with a respective image tiling mechanism of a plurality of image tiling mechanisms, (ii) each tiled image in the plurality of tiled images is generated by selecting a respective N-sized tiled region subset of the plurality of image regions in accordance with the respective image tiling mechanism for the tiled image, (iii) N is a region selection count hyper-parameter that is shared across the plurality of image tiling mechanisms, and (iv) the plurality of image tiling mechanisms comprises a greedy thresholding tiling mechanism that is configured to generate the respective N-sized tiled region subset by selecting, from an occurrence-based region sequence of the plurality of image regions that is ordered in accordance with each region position indicator for the plurality of image regions, first-occurring N image regions whose color distribution ratio sets satisfy one or more color distribution ratio thresholds;

generating, by the one or more processors, a composite-tiled image for the input image that comprises the plurality of tiled images;

generating, by the one or more processors and using a composite-tiled image prediction machine learning model, and based at least in part on the composite-tiled image, a composite-tiled image embedding for the input image;

generating, by the one or more processors, the predictive output based at least in part on the composite-tiled image embedding; and performing, by the one or more processors, one or more prediction-based actions based at least in part on the predictive output.

2. The computer-implemented method of claim 1, wherein the plurality of image tiling mechanisms comprises a sorted selection tiling mechanism that is configured to generate the respective N-sized tiled region subset by selecting, from a distribution-based region ranking of the plurality of image regions that is generated based at least in part on each color distribution ratio set for the plurality of image regions, first-ranked N image regions.

3. The computer-implemented method of claim 1, wherein:
   each image region is part of a respective horizontal row of $\sqrt{N}$ horizontal rows, and
   the plurality of image tiling mechanisms comprises a sorted row-wise selection tiling mechanism that is configured to generate the respective N-sized tiled region subset by: (i) selecting, from each horizontal row, and based at least in part on a row-wise distribution-based region ranking of image regions in the horizontal row that is generated based at least in part on each color distribution ratio set for the image regions, first-ranked $\sqrt{N}$ image regions.

4. The computer-implemented method of claim 1, wherein, given the plurality of image tiling mechanisms comprise T image tiling mechanisms:
   the composite-tiled image comprises T*D image channels, and
   each tile image in the plurality of tiled images is associated with a shared color model having D color model dimensions.

5. The computer-implemented method of claim 1, wherein the input image is a biopsy image.

6. The computer-implemented method of claim 5, wherein the one or more non-whitespace color ranges comprise a first non-whitespace color range that is associated with a nuclei depiction within the biopsy image and a second non-whitespace color range that is associated with tissue depiction within the biopsy image.

7. The computer-implemented method of claim 5, wherein generating the predictive output comprises:
   generating, using a somatic mutation detection machine learning model, and based at least in part on an input genomic sequence for the prediction input data object, a genomic embedding for the input genomic sequence, wherein: (i) the genomic embedding is generated by a sub-ultimate layer of the somatic mutation detection machine learning model, and (ii) an ultimate layer of the somatic mutation detection machine learning model is configured to generate a somatic mutation prediction for a given input genomic sequence based at least in part on the genomic embedding for the given input genomic sequence as generated by the sub-ultimate layer;
   generating, based at least in part on the genomic embedding and the composite-tiled image embedding, a hybrid square matrix for the prediction input data object; and
   generating, using a hybrid input prediction machine learning model, and based at least in part on the hybrid square matrix, the predictive output.

8. A system for generating a predictive output for a prediction input data object that comprises an input image comprising a plurality of image regions, the system comprising one or more processors and memory including program code, the memory and the program code configured to, with the one or more processors, cause the system to at least:
   for each image region in the plurality of image regions, generate a color distribution ratio set that comprises: (i) a whitespace presence ratio for the image region, and (ii) one or more non-whitespace color range presence ratios for the image region with respect to one or more non-whitespace color ranges;
   generate a plurality of tiled images for the input image, wherein: (i) each tiled image in the plurality of tiled images is associated with a respective image tiling mechanism of a plurality of image tiling mechanisms, (ii) each tiled image in the plurality of tiled images is generated by selecting a respective N-sized tiled region subset of the plurality of image regions in accordance with the respective image tiling mechanism for the tiled image, (iii) N is a region selection count hyper-parameter that is shared across the plurality of image tiling mechanisms, and (iv) the plurality of image tiling mechanisms comprises a greedy thresholding tiling mechanism that is configured to generate the respective N-sized tiled region subset by selecting, from an occurrence-based region sequence of the plurality of image regions that is ordered in accordance with each region position indicator for the plurality of image regions, first-occurring N image regions whose color distribution ratio sets satisfy one or more color distribution ratio thresholds;
   generate a composite-tiled image for the input image that comprises the plurality of tiled images;
   generate, using a composite-tiled image prediction machine learning model, and based at least in part on the composite-tiled image, a composite-tiled image embedding for the input image;
   generate the predictive output based at least in part on the composite-tiled image embedding; and
   perform one or more prediction-based actions based at least in part on the predictive output.

9. The system of claim 8, wherein the plurality of image tiling mechanisms comprises a sorted selection tiling mechanism that is configured to generate the respective N-sized tiled region subset by selecting, from a distribution-based region ranking of the plurality of image regions that is generated based at least in part on each color distribution ratio set for the plurality of image regions, first-ranked N image regions.

10. The system of claim 8, wherein:
    each image region is part of a respective horizontal row of $\sqrt{N}$ horizontal rows, and
    the plurality of image tiling mechanisms comprises a sorted row-wise selection tiling mechanism that is configured to generate the respective N-sized tiled region subset by: (i) selecting, from each horizontal row, and based at least in part on a row-wise distribution-based region ranking of image regions in the horizontal row that is generated based at least in part on each color distribution ratio set for the image regions, first-ranked $\sqrt{N}$ image regions.

11. The system of claim 8, wherein, given the plurality of image tiling mechanisms comprise T image tiling mechanisms:
    the composite-tiled image comprises T*D image channels, and
    each tile image in the plurality of tiled images is associated with a shared color model having D color model dimensions.

12. The system of claim 8, wherein the input image is a biopsy image.

13. The system of claim 12, wherein the one or more non-whitespace color ranges comprise a first non-whitespace color range that is associated with a nuclei depiction within the biopsy image and a second non-whitespace color range that is associated with tissue depiction within the biopsy image.

14. The system of claim 12, wherein to generate the predictive output, the one or the memory and the program code are further configured to, with the one or more processors to, cause the system to at least:

generate, using a somatic mutation detection machine learning model, and based at least in part on an input genomic sequence for the prediction input data object, a genomic embedding for the input genomic sequence, wherein: (i) the genomic embedding is generated by a sub-ultimate layer of the somatic mutation detection machine learning model, and (ii) an ultimate layer of the somatic mutation detection machine learning model is configured to generate a somatic mutation prediction for a given input genomic sequence based at least in part on the genomic embedding for the given input genomic sequence as generated by the sub-ultimate layer;

generate, based at least in part on the genomic embedding and the composite- tiled image embedding, a hybrid square matrix for the prediction input data object; and generate, using a hybrid input prediction machine learning model, and based at least in part on the hybrid square matrix, the predictive output.

15. A computer program product for generating a predictive output for a prediction input data object that comprises an input image comprising a plurality of image regions, the computer program product comprising at least one non-transitory computer readable storage medium having computer-readable program code portions stored therein, the computer- readable program code portions configured to:

for each image region in the plurality of image regions, generate a color distribution ratio set that comprises: (i) a whitespace presence ratio for the image region, and (ii) one or more non- whitespace color range presence ratios for the image region with respect to one or more non- whitespace color ranges;

generate a plurality of tiled images for the input image, wherein: (i) each tiled image in the plurality of tiled images is associated with a respective image tiling mechanism of a plurality of image tiling mechanisms, (ii) each tiled image in the plurality of tiled images is generated by selecting a respective N-sized tiled region subset of the plurality of image regions in accordance with the respective image tiling mechanism for the tiled image, (iii) N is a region selection count hyper-parameter that is shared across the plurality of image tiling mechanisms, and (iv) the plurality of image tiling mechanisms comprises a greedy thresholding tiling mechanism that is configured to generate the respective N-sized tiled region subset by selecting, from an occurrence-based region sequence of the plurality of image regions that is ordered in accordance with each region position indicator for the plurality of image regions, first-occurring N image regions whose color distribution ratio sets satisfy one or more color distribution ratio thresholds;

generate a composite-tiled image for the input image that comprises the plurality of tiled images;

generate, using a composite-tiled image prediction machine learning model, and based at least in part on the composite-tiled image, a composite-tiled image embedding for the input image;

generate the predictive output based at least in part on the composite-tiled image embedding; and perform one or more prediction-based actions based at least in part on the predictive output.

16. The computer program product of claim 15, wherein the plurality of image tiling mechanisms comprises a sorted selection tiling mechanism that is configured to generate the respective N-sized tiled region subset by selecting, from a distribution-based region ranking of the plurality of image regions that is generated based at least in part on each color distribution ratio set for the plurality of image regions, first-ranked N image regions.

17. The computer program product of claim 15, wherein:

each image region is part of a respective horizontal row of $\sqrt{N}$ horizontal rows, and the plurality of image tiling mechanisms comprises a sorted row-wise selection tiling mechanism that is configured to generate the respective N-sized tiled region subset by: (i) selecting, from each horizontal row, and based at least in part on a row-wise distribution-based region ranking of image regions in the horizontal row that is generated based at least in part on each color distribution ratio set for the image regions, first-ranked $\sqrt{N}$ image regions.

18. The computer program product of claim 15, wherein, given the plurality of image tiling mechanisms comprise T image tiling mechanisms:

the composite-tiled image comprises T*D image channels, and each tile image in the plurality of tiled images is associated with a shared color model having D color model dimensions.

19. The computer program product of claim 15, wherein the input image is a biopsy image.

20. The computer program product of claim 19, wherein the one or more non-whitespace color ranges comprise a first non-whitespace color range that is associated with a nuclei depiction within the biopsy image and a second non-whitespace color range that is associated with tissue depiction within the biopsy image.

* * * * *